(12) United States Patent
Kim et al.

(10) Patent No.: US 11,678,012 B2
(45) Date of Patent: Jun. 13, 2023

(54) APPARATUS AND METHOD FOR USER INTEREST INFORMATION GENERATION

(71) Applicant: SAMSUNG ELECTRONICS CO., LTD., Suwon-si (KR)

(72) Inventors: Do Gon Kim, Daegu (KR); Kyung Su Kim, Seoul (KR); Sung Jin Kim, Yongin-si (KR); Kumar Ankit, Seoul (KR); Gang Hui Lee, Suwon-si (KR); Hyung Min Lee, Seoul (KR); Jae Hyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 479 days.

(21) Appl. No.: 16/761,957

(22) PCT Filed: Apr. 4, 2018

(86) PCT No.: PCT/KR2018/003972
§ 371 (c)(1),
(2) Date: May 6, 2020

(87) PCT Pub. No.: WO2019/093599
PCT Pub. Date: May 16, 2019

(65) Prior Publication Data
US 2021/0182558 A1 Jun. 17, 2021

(30) Foreign Application Priority Data
Nov. 10, 2017 (KR) .......... 10-2017-0149414

(51) Int. Cl.
*G06V 10/70* (2022.01)
*G06V 20/20* (2022.01)
(Continued)

(52) U.S. Cl.
CPC ........ *G06V 20/20* (2022.01); *G06F 18/24323* (2023.01); *G06N 3/04* (2013.01);
(Continued)

(58) Field of Classification Search
CPC .... G06K 9/6282; G06N 3/04; G06Q 30/0627; H04N 21/44008; H04N 21/45;
(Continued)

(56) References Cited

U.S. PATENT DOCUMENTS

| 7,725,484 | B2 * | 5/2010 | Nister ................ G06F 16/5838 707/706 |
| 8,275,221 | B2 | 9/2012 | Poetker et al. |

(Continued)

FOREIGN PATENT DOCUMENTS

| CN | 102324042 | 1/2012 |
| CN | 102395966 | 3/2012 |

(Continued)

OTHER PUBLICATIONS

Second Office Action dated Mar. 3, 2022 in Chinese Patent Application No. 201880077875.8 and English-language translation.
(Continued)

*Primary Examiner* — Ian L Lemieux
(74) *Attorney, Agent, or Firm* — Nixon & Vanderhye, P.C.

(57) ABSTRACT

The present invention relates to an artificial intelligence (AI), which emulates functions of a human brain, such as recognition and reasoning, by utilizing a machine learning algorithm such as deep learning, and relates to context awareness based artificial intelligence application technology for obtaining interest information of a user from an image displayed to the user. An electronic device, according to one embodiment of the present invention acquires context data related to the image, and uses the context data to select
(Continued)

a node of interest corresponding to the context data from among nodes of an index tree for searching for sample images which correspond to candidate objects extracted from the image by using a model generated as a result of machine learning, wherein the node of interest is selected by using a result of comparison between a subject of each node of the index tree and the context data; and an object of interest is selected from among the candidate objects included in the image by using the node of interest.

18 Claims, 17 Drawing Sheets

(51) Int. Cl.
*G06N 3/04* (2023.01)
*G06Q 30/0601* (2023.01)
*G06V 10/764* (2022.01)
*G06V 30/19* (2022.01)
*G06F 18/243* (2023.01)

(52) U.S. Cl.
CPC ......... *G06Q 30/0627* (2013.01); *G06V 10/70* (2022.01); *G06V 10/764* (2022.01); *G06V 30/19173* (2022.01)

(58) Field of Classification Search
CPC ............. H04N 21/466; H04N 21/4532; H04N 21/4666; G06V 10/70; G06V 10/764; G06V 20/20; G06V 30/19173
See application file for complete search history.

(56) References Cited

U.S. PATENT DOCUMENTS

| | | | |
|---|---|---|---|
| 9,195,898 B2 | 11/2015 | Huang et al. | |
| 9,235,779 B2 | 1/2016 | Kim et al. | |
| 9,588,990 B1 | 3/2017 | Ioffe et al. | |
| 9,928,448 B1* | 3/2018 | Merler ..................... | G06N 3/08 |
| 10,089,332 B2 | 10/2018 | Lee et al. | |
| 10,095,985 B2* | 10/2018 | Hatami-Hanza ... | G06Q 30/0207 |
| 10,474,670 B1* | 11/2019 | Hoover ................. | G06F 16/245 |
| 10,534,980 B2* | 1/2020 | Lee ....................... | G06V 10/758 |
| 10,650,264 B2* | 5/2020 | Harada ................. | G06V 10/421 |
| 10,909,166 B1* | 2/2021 | Bogazzi ............... | G06K 9/6231 |
| 2002/0032697 A1 | 3/2002 | French et al. | |
| 2009/0297045 A1* | 12/2009 | Poetker .................. | G06F 16/50 |
| | | | 705/7.29 |
| 2010/0260426 A1 | 10/2010 | Huang et al. | |
| 2012/0173500 A1 | 7/2012 | Chakrabarti et al. | |
| 2013/0170738 A1* | 7/2013 | Capuozzo ............. | G06V 20/30 |
| | | | 382/226 |
| 2014/0037198 A1 | 2/2014 | Larlus-Larrondo et al. | |
| 2016/0062993 A1 | 3/2016 | Lee et al. | |
| 2016/0094774 A1 | 3/2016 | Li et al. | |
| 2016/0162731 A1 | 6/2016 | Li et al. | |
| 2017/0178335 A1 | 6/2017 | Pavani et al. | |
| 2017/0185670 A1* | 6/2017 | Dua ........................ | G06F 16/86 |
| 2018/0157681 A1* | 6/2018 | Yang ................. | G06F 16/90332 |
| 2020/0251091 A1* | 8/2020 | Zhao ........................ | G10L 15/26 |
| 2021/0142097 A1* | 5/2021 | Zheng ...................... | G06N 3/08 |

FOREIGN PATENT DOCUMENTS

| | | | |
|---|---|---|---|
| CN | 103679132 | 3/2014 | |
| CN | 104036023 A * | 9/2014 | ....... G06F 17/30858 |
| CN | 105045907 | 11/2015 | |
| CN | 105306340 | 2/2016 | |
| CN | 106445995 | 2/2017 | |
| CN | 106462568 | 2/2017 | |
| JP | 5580811 | 8/2014 | |
| KR | 10-2013-0055029 | 5/2013 | |
| KR | 10-2013-0066819 | 6/2013 | |
| KR | 10-2014-0094052 | 7/2014 | |
| KR | 10-2016-0004739 | 1/2016 | |
| KR | 10-2016-0023164 | 3/2016 | |
| KR | 10-1725501 | 4/2017 | |
| WO | 99/52080 | 10/1999 | |
| WO | 2010/120901 | 10/2010 | |
| WO | 2015/123601 | 8/2015 | |

OTHER PUBLICATIONS

Extended Search Report dated Jul. 3, 2020 in counterpart European Patent Application No. 18877211.5.
First Office Action dated Aug. 3, 2021 in counterpart Chinese Patent Application No. 201880077875.8 and English-language translation.
Notice of Preliminary Rejection dated Sep. 23, 2021 in counterpart Korean Patent Application No. 10-2017-0149414 and English-language translation.
Communication purusant to Article 94(3) EPC dated Oct. 19, 2021 in counterpart European Patent Application No. 18877211.5.
Communication pursuant to Article 94(3) EPC dated Feb. 12, 2021 in counterpart European Patent Application No. 18877211.5.
International Search Report for PCT/KR2018/003972 dated Aug. 10, 2018, 6 pages, with English Translation.
Written Opinion of ISA for PCT/KR2018/003972 dated Aug. 10, 2018, 19 pages, with English Translation.
Notice of Allowance dated Aug. 1, 2022 in Chinese Patent Application No. 201880077875.8 and English-language translation.

* cited by examiner

APPARATUS AND METHOD FOR USER INTEREST INFORMATION GENERATION

This application is the U.S. national phase of International Application No. PCT/KR2018/003972 filed Apr. 4, 2018 which designated the U.S. and claims priority to KR Patent Application No. 10-2017-0149414 filed Nov. 10, 2017, the entire contents of each of which are hereby incorporated by reference.

BACKGROUND

1. Technical Field

This disclosure relates to an artificial intelligence (AI) system for emulating functions of a human brain, such as recognition and reasoning, by utilizing a machine learning algorithm such as deep learning and an application thereof, and relates to context awareness based AI application technology for obtaining interest information of a user from an image displayed to a user.

2. Description of Related Art

An artificial intelligence (AI) system is a system that implements intelligence of a human level and is a system in which a machine learns, judges, and iteratively improves analysis and decision making, unlike an existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

AI technology is composed of machine learning (deep learning) and element technology utilizing machine learning. Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Various fields implementing AI technology may include the following. Linguistic understanding is a technology for recognizing, applying, and/or processing human language or characters and includes natural language processing, machine translation, dialogue system, question and answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

A technology of estimating interest information of a user is provided by analyzing a feedback of a user for various contents exposed to a user. As a representative, technology such as aggregating positive feedback for content posted on a social network and obtaining information of interest of the user from a common point of the contents which obtained positive feedback are known. In order to extract the information on the user's interest from the image exposed to the user, it is necessary to analyze which topics are included in the image. For this purpose, a process is performed for recognition of an object included in the image, and identification of a topic that is represented by each recognized object.

In order not to limit a range of information of interest that may be extracted, it is not desirable that the topic of the object to be identified be limited to a specific range. However, a computing load for object identification without limitation of the range is in level that is difficult to handle unless there is an electronic device having high performance such as a server with a very excellent computing performance. In addition, object recognition without limitation of the range is likely to have a problem with an accuracy.

Even if the problem of computing load and accuracy is solved, current techniques do not provide a way to select an object of interest that is identified to be of interest to the user exposed to the image among the objects recognized in the image. If a plurality of different objects are recognized in an image, selecting which object of the plurality of objects is an object of interest is very important in obtaining the user's interest information. A large number of images may have a plurality of objects.

The technology which is currently provided misses a key configuration for generating the user's interest information from the image exposed to the user.

Therefore, it is necessary to provide a context awareness-based AI application technology with such a core configuration related to the selection of the object of interest in the image, which may be used in an electronic device of which computing performance is not relatively excellent, such as a user terminal, or the like, but provides high accuracy.

SUMMARY

The disclosure is to address the above-described problems, and an object of the disclosure is to provide an electronic device and a method for implementing an AI application technology for obtaining information which is estimated such that a user is interested in, from the image by considering context data when an image is displayed.

The disclosure provides an electronic device for implementing an AI application technology and a method thereof, capable of increasing a speed at which an object of interest in an image is selected by selecting a node of interest of an index tree for searching for a sample image corresponding to each of the objects recognized in the image, and starting a search of a sample image matched with the recognized object from the node of interest.

The technical challenges of the disclosure are not limited to the above-mentioned technical challenges, and other technical challenges not mentioned may be clearly understood by one of those skilled in the art from the following description.

According to an embodiment, an electronic device includes a processor, a display displaying an image, and a memory storing a plurality of instructions executed by the processor. The plurality of instructions include an instruction for obtaining context data associated with an image displayed on the display, an instruction for selecting a node, among nodes of an index tree for searching for a sample image corresponding to a candidate object of the image, of interest corresponding to the context data by using the context data, and selecting the node of interest using a comparison result between a subject of each node of the index tree and the context data, and an instruction for selecting an object of interest among candidate objects included in the image using the node of interest. The index tree may be hierarchically connected to another node in accordance with a semantic relation among subjects of each node.

In an embodiment, the context data may include a plurality of context elements, and instructions for selecting the node of interest may include instructions for selecting a lowermost node among the plurality of nodes corresponding to the plurality of context elements as the node of interest.

In an embodiment, the plurality of context elements may include a first context element and a second context element and, based on the lowermost node between the first node corresponding to the first context element and the second node corresponding to the second context element being a second node, the instruction for selecting the object of interest may include, based on failing to search for object, among the candidate objects, corresponding to the second node, an instruction for searching for an object corresponding to the first node among the plurality of candidate objects; and an instruction for selecting an object of interest among candidate objects included in the image using the first node. The first note has a depth of N, where N is a natural number greater than or equal to 1, on the index tree, and the first node has a depth of N+2, where N is a natural number greater than or equal to 1, on the index tree, and an instruction for searching for an object corresponding to the first node among the plurality of candidate objects may include, based on failing to search for an object, among candidate objects, corresponding to the second node, pass one or more node present between the second node and the first node and travel to the first node.

In an embodiment, the instruction for selecting the object of interest may include an instruction for, based on failing to search for an object, among the candidate objects, corresponding to the node of interest, searching for an object corresponding to an upper node of the node of interest among the plurality of candidate objects, and an instruction for selecting an object of interest among candidate objects included in the image using the upper node.

In an embodiment, the nodes of the index tree may include a leaf node and a non-leaf node, each of the non-leaf node may include a classifier for receiving feature data and generating an output indicating a child node corresponding to the feature data, an instruction for selecting an object of interest among the candidate objects included in the image using the node interest may include an instruction, based on the node of interest being the non-leaf node, for inputting feature data of the candidate object to the classifier of the node of interest and traveling to the child node indicated by output of the classifier, and an instruction for repeating the instruction to travel to the child node until a leaf node is reached. The leaf node is matched with one or more images matched to a subject allocated to the leaf node among each sample image of an image archive, and an instruction for selecting an object of interest among the candidate objects included in the image using the node of interest may include an instruction, based on reaching the leaf node, for identifying whether the sample image matched with the leaf node matches the candidate object and an instruction for selecting the candidate object that is identified as being matched with the image matched with the leaf node as the object of interest. The instruction for selecting an object of interest among candidate objects included in the image using the node of interest may include, based on the output of the classifier of the current node indicating that a child node corresponding to the feature data is not present for all candidate objects, an instruction traveling to an upper node of the current node, and the upper node of the current node is a closest upper node, among the upper nodes of the current node, matched with one of a plurality of context elements included in the context data.

In an embodiment, the instruction for obtaining the context data may obtain context data matched with a subject of at least some nodes among the nodes of the index tree. In another embodiment, the instruction for obtaining the context data may include an instruction for obtaining a text simultaneously displayed with the image on the display as the context data. In an embodiment, the instruction for obtaining the context data may include obtaining positioning information of the electronic device as the context data. In another embodiment, the instruction for obtaining the context data may include an instruction for obtaining a text that is obtained by converting voice data input through a microphone while the image is being displayed on the display as the context data.

In an embodiment, the instruction for obtaining the context data may include an instruction for obtaining the context data based on sensing a trigger of an object of interest selection operation, and the trigger is indicative of sensing an operation associated with the image of a user of the electronic device, displaying a keyboard on the display while the image is being displayed, or a screen capture manipulation is sensed, and the trigger may indicative of sensing gazing for a predetermined time or more through a gaze recognition sensor.

According to another embodiment, a method for generating user's interest information includes obtaining context data at a time point of displaying of an image, selecting a node, among nodes of an index tree to search for a sample image corresponding to a plurality of candidate objects recognized in the image, of interest corresponding to the context data by using the context data, and selecting a node of interest among the plurality of candidate objects using the node of interest.

In an embodiment, the index tree is hierarchically connected to another node in accordance with a semantic relation among subjects of each node, each of a non-leaf mode of the index tress may include an inherent classifier, the inherent classifier may receive feature data of an image to generate an output indicating a child node corresponding to the feature data, and the leaf node may be matched with one or more images matched with a subject of the leaf node, and the selecting the object of interest may include based on the node of interest being the non-leaf node, inputting feature data of the candidate object to the classifier of the node of interest and traveling to the child node indicated by output of the classifier, repeating an instruction to travel to the child node until a leaf node is reached, based on the leaf node being reached, identifying whether a sample image matched with the leaf node is matched with the candidate object, and selecting the candidate object that is identified as being matched with the leaf node as the object of interest. In an embodiment, the plurality of candidate objects may include a first object and a second object, the traveling to the child node indicated by the output of the classifier may include, based on the output of the classifier according to an input of feature data of the first object indicating traveling to one of child nodes of the current node and the output of the classifier according to input of feature data of the second object indicating that a child node corresponding to the second object is not present, splitting a tree search for the first object and a tree search for the second object. In another embodiment, the plurality of candidate objects may include a first object and a second object, and the traveling to the child node indicated by the output of the classifier may include, based on the output of the classifier according to an input of feature data of the first object indicating traveling to one of child nodes of the current node and the output of the classifier according to input of feature data of the second object indicating that a child node corresponding to the second object is not present, terminating a tree search for the second object.

DETAILED DESCRIPTION

Figure 1:
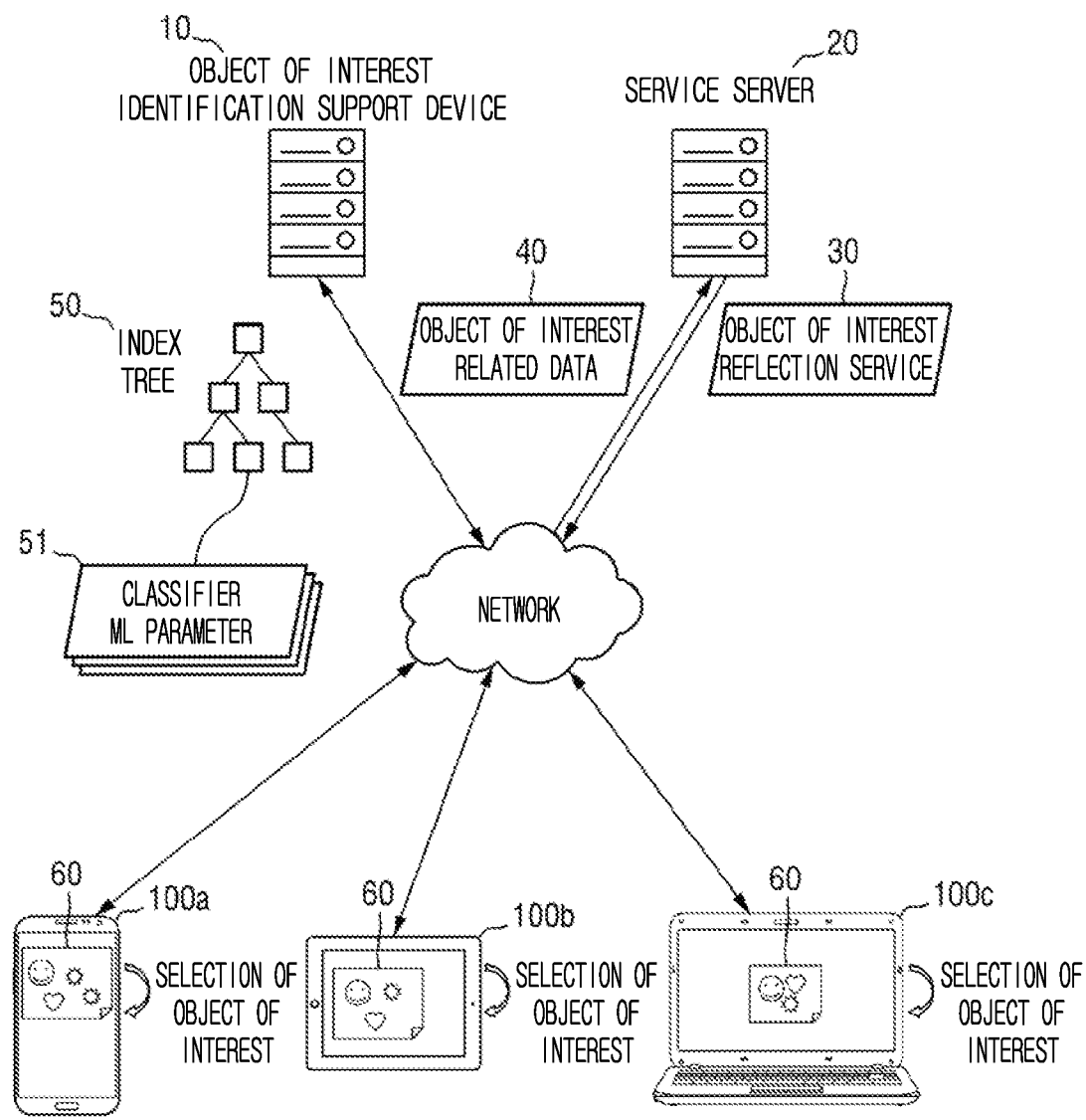
FIG. 1 is a system configuration diagram illustrating a user's interest information generating system according to an embodiment.
Figure 2:
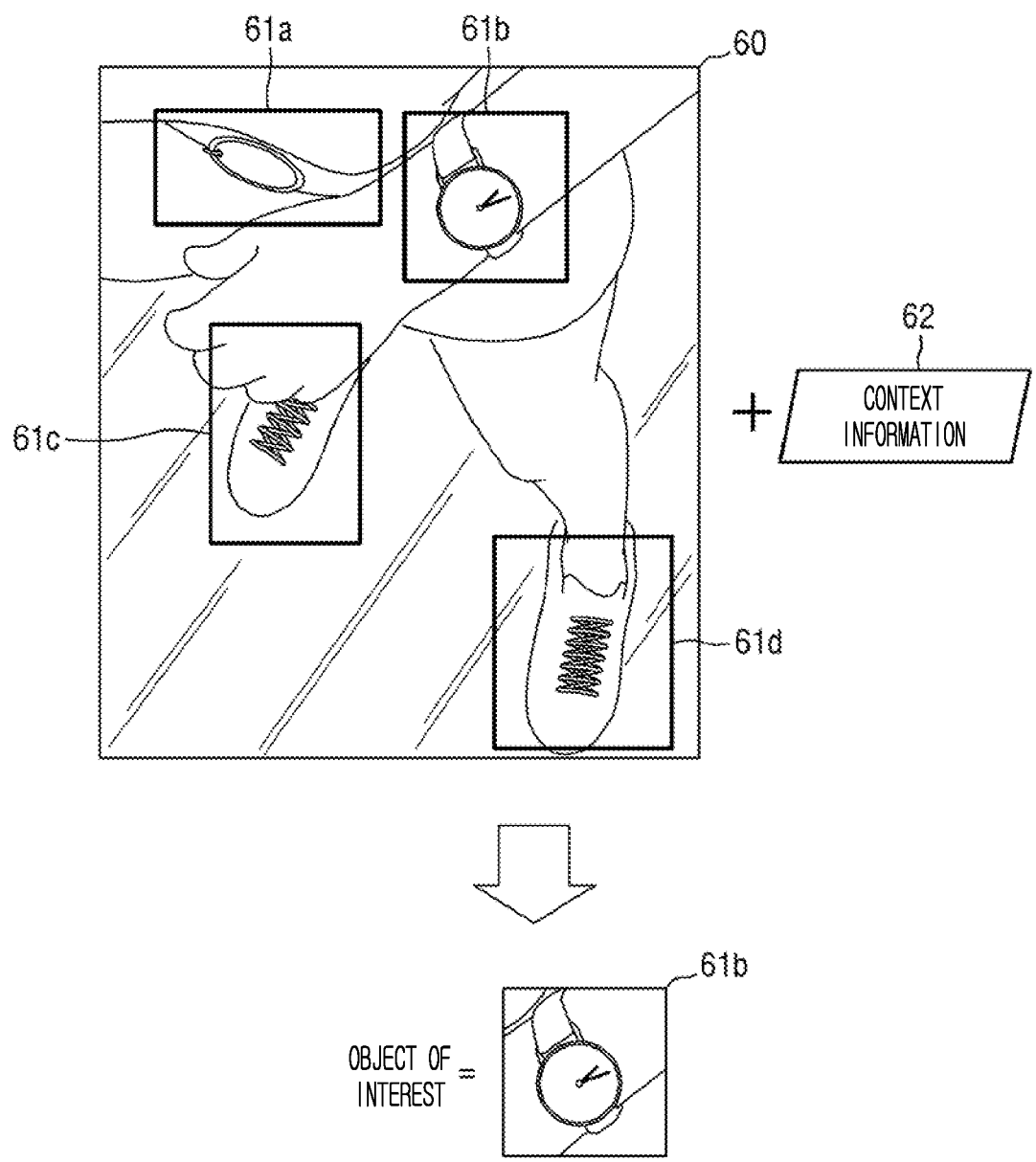
FIG. 2 is a concept diagram illustrating selection of context data-based object of interest according to embodiments.

Hereinafter, preferred embodiments will be described in detail with reference to the accompanying drawings. The advantages and features of the disclosure, and the manner of attaining them, will become apparent upon reference to the following detailed description taken in conjunction with the accompanying drawings. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like reference numerals refer to like elements throughout the disclosure.

All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure may not be interpreted as excluding the embodiments of the disclosure. Unless otherwise defined specifically, a singular expression may encompass a plural expression. Hereinbelow, various embodiments will be described with reference to the attached drawings.

Referring to FIG. 1, a configuration and operation of a user interest information system according to an embodiment will be described. The system may include an object of interest identification support device 10 and electronic devices 100a, 100b, and 100c. The electronic devices 100a, 100b, and 100c may be a user terminal used by a user and may include, for example, an electronic device such as a smartphone, a wearable device such as a smartwatch, a tablet, a desktop, a notebook, a digital television (TV), a digital signage, a computing device provided with an operational processor such as a kiosk, or a digital device equipped with computing means, or the like.

An object of interest identification support device 10 manages the data necessary for electronic devices 100a, 100b, and 100c to perform the identification of an object of interest, such as an index tree 50, a classifier machine learning (ML) parameter 51, and feature data set (not shown) of sample images grouped by each terminal node of the index tree 50, and if a update to the data exists, the object of interest identification support device 10 transmits updated data to the electronic devices 100a, 100b, 100c.

The index tree 50 is a data structure for searching for a sample image that matches the object for identifying a subject. The sample image is grouped based on the subject. In order to recognize the subject of the image, a comparison result with the sample image may be referenced. The sample images of each subject may be accessed through a leaf node of the subject of the index tree 50.

As the images of the various subjects should be able to be recognized, and each subject may be represented in a variety of images, the number of sample images will gradually increase in order to improve performance for image recognition. The similarity comparison between images has been developed from a comparison scheme between pixels to a comparison scheme using a feature data set (also referred to as a "feature vector"). The retention of the sample image itself is not essential. The feature data for the sample image may be extracted in advance, and only the feature data of each sample image, not each sample image, may be managed to save a storage space and increase an operation speed. Accordingly, the feature data of the sample image, not the sample image of each subject, may be linked to the leaf node of the subject.

Through analysis of an image 60 displayed on the electronic devices 100a, 100b, 100c, one or more objects included in the image 60 are recognized. Such object recognition may be performed based on AI technology. For example, machine learning using a training dataset may be performed by a machine learning performing device, and one or more objects included in the image 60 may be recognized using the object recognition model generated as a result of the machine learning. One or more objects recognized in the image 60 are referred to as "candidate object". In addition, the object in which a user of a candidate object is estimated to be interested is referred to as an "object of interest." An example of recognizing an object in the image 60 will be described below with reference to FIG. 9 or FIG. 11.

In order to recognize what the candidate object represents, it is necessary to traverse the index tree 50 from a root node to a leaf node in a top-down manner, and to find a leaf node that is identified to have a sample image similar to the candidate object in the traversal process. In the traversal process, if the current node is a non-leaf node having a plurality of child nodes, a problem may occur regarding to which child node a travelling needs to be made. At this time, using a classifier of the non-terminal node, the child node to travel is selected.

In some embodiments, the classifier is an image classification model generated using a machine learning technology.

As described above, in the search of the index tree 50, the output of the classifier becomes the reference data to be directed to the leaf node which is a final destination. The classifier may be configured in electronic devices 100*a*, 100*b*, 100*c* using the classifier ML parameter 51. That is, when the current node is directed to the leaf node, it is determined to which node among the child nodes of the current node a movement should be made, and here, the movement should be made to the child node indicated by output data of the classifier of the current node.

Since each non-leaf node has different child nodes, each non-leaf node may have inherent classifier. Accordingly, the object of interest identification support device 10 may perform machine learning training using training data for each non-leaf node, thereby generating a classifier of object images inherent to each non-leaf node. In the case where supervised learning type machine learning is performed, when the first non-leaf node has a first child node and a second child node, the training data of the first non-leaf node may include assigned first tag as the feature data set of the sample data of a lower node of the first child node and assigned second tag as the feature data set of the sample data of a lower node of the second child node.

The object of interest object identification support device 10 may use unsupervised learning or semi-supervised learning based on deep learning technology in generating the classifier for each non-leaf node of the index tree 50.

The electronic devices 100*a*, 100*b*, and 100*c* display the image 60 and use the data received from the object of interest identification support device 10 to select an object of interest among the plurality of candidate objects within the image 60. The electronic devices 100*a*, 100*b*, and 100*c* may select the object of interest using context data at the time of displaying the image 60. A method for selecting an object of interest will be described later.

The electronic devices 100*a*, 100*b*, and 100*c* may store information about the selected object of interest, configure data 40 associated with the object of interest periodically or non-periodically, and transmit the same to the service server 20. The service server 20 is a server device that provides an online service such as digital advertisement transmission, recommended content provision, or the like, to the electronic devices 100*a*, 100*b*, 100*c*. The service server 20 may use the data 40 related to object of interest to transmit user-customized online service data for each electronic device 100*a*, 100*b*, 100*c*. A detailed description of the configuration and operation of the electronic device will be described below.

The context data-based object of interest selection will be described with reference to FIGS. 2 to 5 through embodiments.

Assume that the image 60 having a plurality of candidate objects 61*a*, 61*b*, 61*c*, and 61*d* is displayed. Recognizing the plurality of candidate objects 61*a*, 61*b*, 61*c*, and 61*d* in the image 60 may be performed by using various object recognition methodology known in the art. For example, the object recognition may be performed by inputting data of the image 60 to an object recognition model generated through machine learning and processing the output data. The object recognition model may be, for example, composed of an AI network. In this case, the electronic device that recognizes the candidate object in the image 60 may be stored with artificial neural network data that outputs data for object recognition. In some embodiments, an object of interest 61*b* among the plurality of candidate objects 61*a*, 61*b*, 61*c*, 61*d* is selected using context information 62 at the time of displaying the image 60.

As described below, using context data, a node of interest corresponding to the context data of the nodes of the index tree is selected. The node of interest is selected by using a comparison result between a subject of each node of the index tree and the context data. Using the node of interest, an object of interest among the candidate objects included in the image is selected. Accordingly, context data matching the subject of at least some nodes among the nodes of the index tree may be significant for selection of an object of interest. According to one embodiment, the context data defined as matching the subject of the nodes of the index tree is obtained, and unnecessary noise is collected as context data, thereby preventing the computing load from being consumed.

The context information may refer to information about a situation in which the image 60 is displayed. The situation around the device displaying an image when the image 60 is displayed will be almost matching the situation where the user of the device is in contact. According to some embodiments, in the selection of the object of interest 61*b*, the user's interest exposed to the image 60 is reflected by reflecting the context information around the device on which the image 60 is displayed, at the time when the image 60 is displayed.

Various types of context information may be referred to estimate a user's interest. Hereinbelow, some embodiments will be described.

Figure 3:
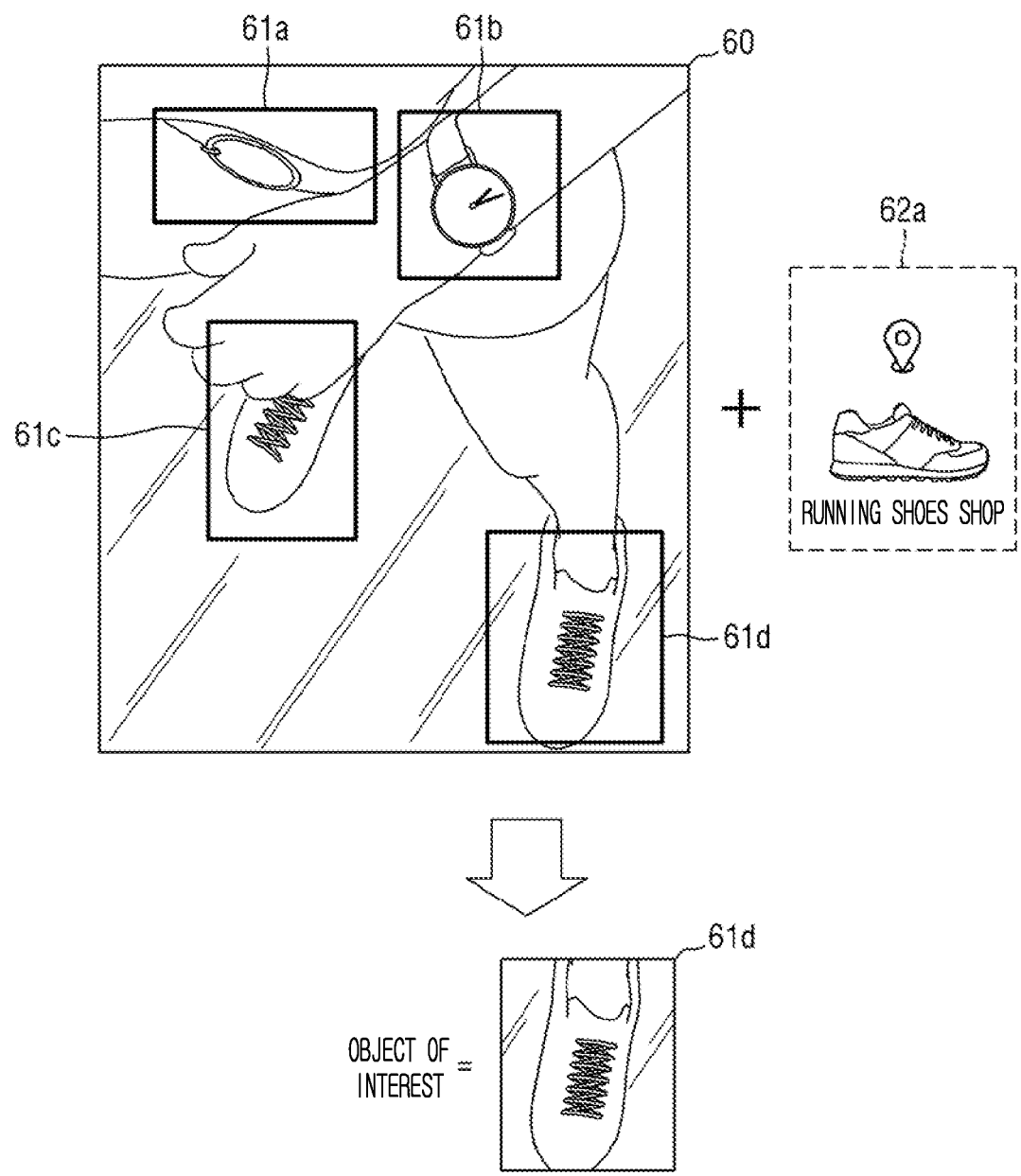
FIG. 3 is a concept diagram illustrating selection of positioning information-based object of interest according to an embodiment.

In one embodiment, as shown in FIG. 3, positioning information of the device displaying the image 60 may be used as the context information. As shown in FIG. 3, if it is determined that the current position is a running shoes shop in accordance with the positioning information of the device, a shoes image 61*d* that is the fourth candidate object among a belt image 61*a* that is a first candidate object, a watch image 61*b* that is a second candidate object, a part of an image 61*c* of the shoes that is a third candidate object, and an image 61*d* of the shoes that is a fourth candidate object, may be selected as the object of interest.

Figure 4:
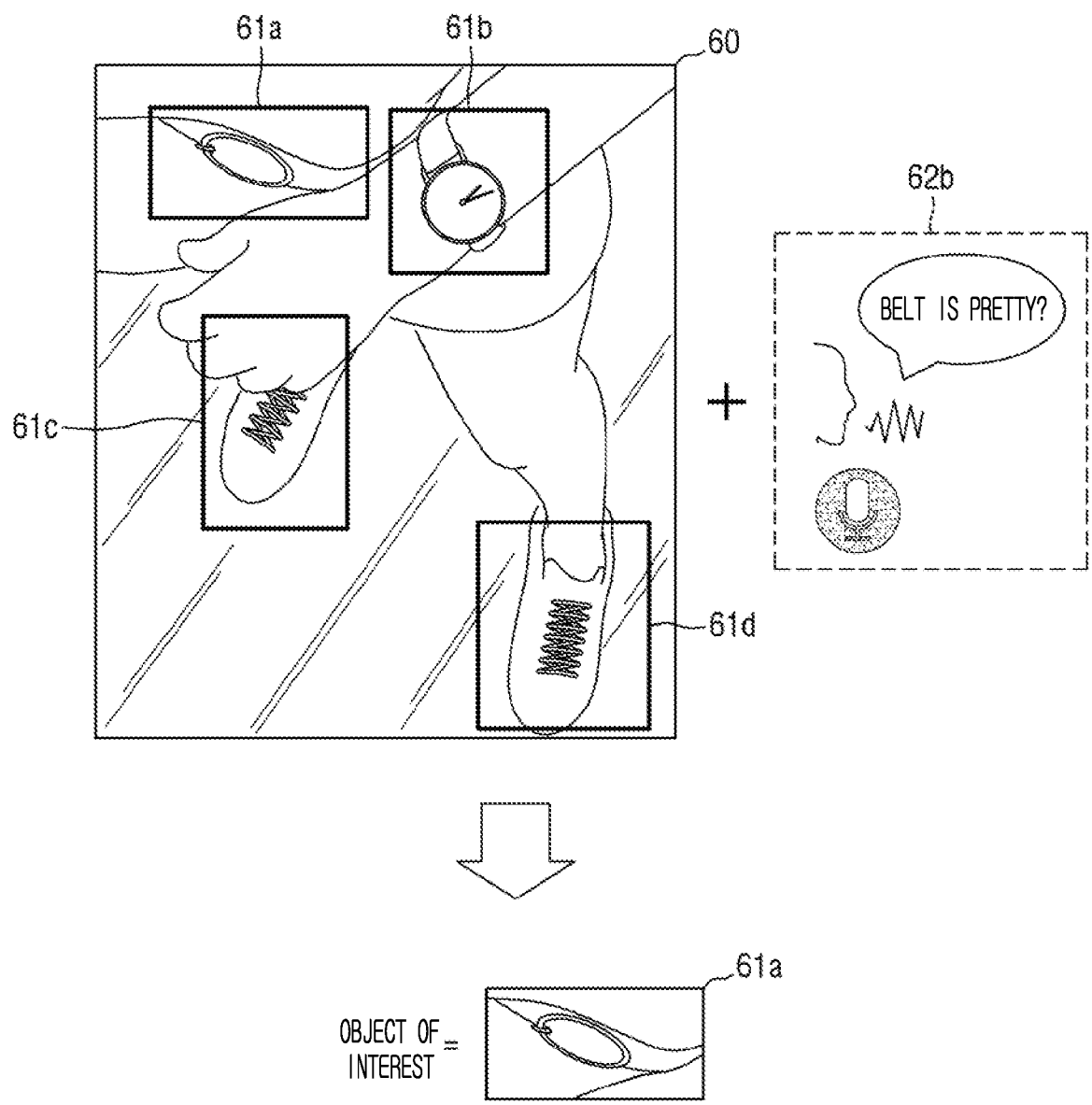
FIG. 4 is a concept diagram illustrating selection of voice-based object of interest according to an embodiment.

In another embodiment, as shown in FIG. 4, a microphone of the device that displays the image 60, or a voice sensed while the image 60 is being displayed by a microphone of a device connected in wired or wireless communication with the device, may be used as the context information. As shown in FIG. 4, as a result of converting the voice into a text (speech to text (STT)), if a text "the belt is pretty" and the subject "belt" of the index tree node is detected in the obtained text, a belt image 61*a* that is the first candidate object among a belt image 61*a* that is a first candidate object, a watch image 61*b* that is a second candidate object, a part of an image 61*c* of the shoes that is a third candidate object, and an image 61d of the shoes that is a fourth candidate object, may be selected as the object of interest.

Figure 5:
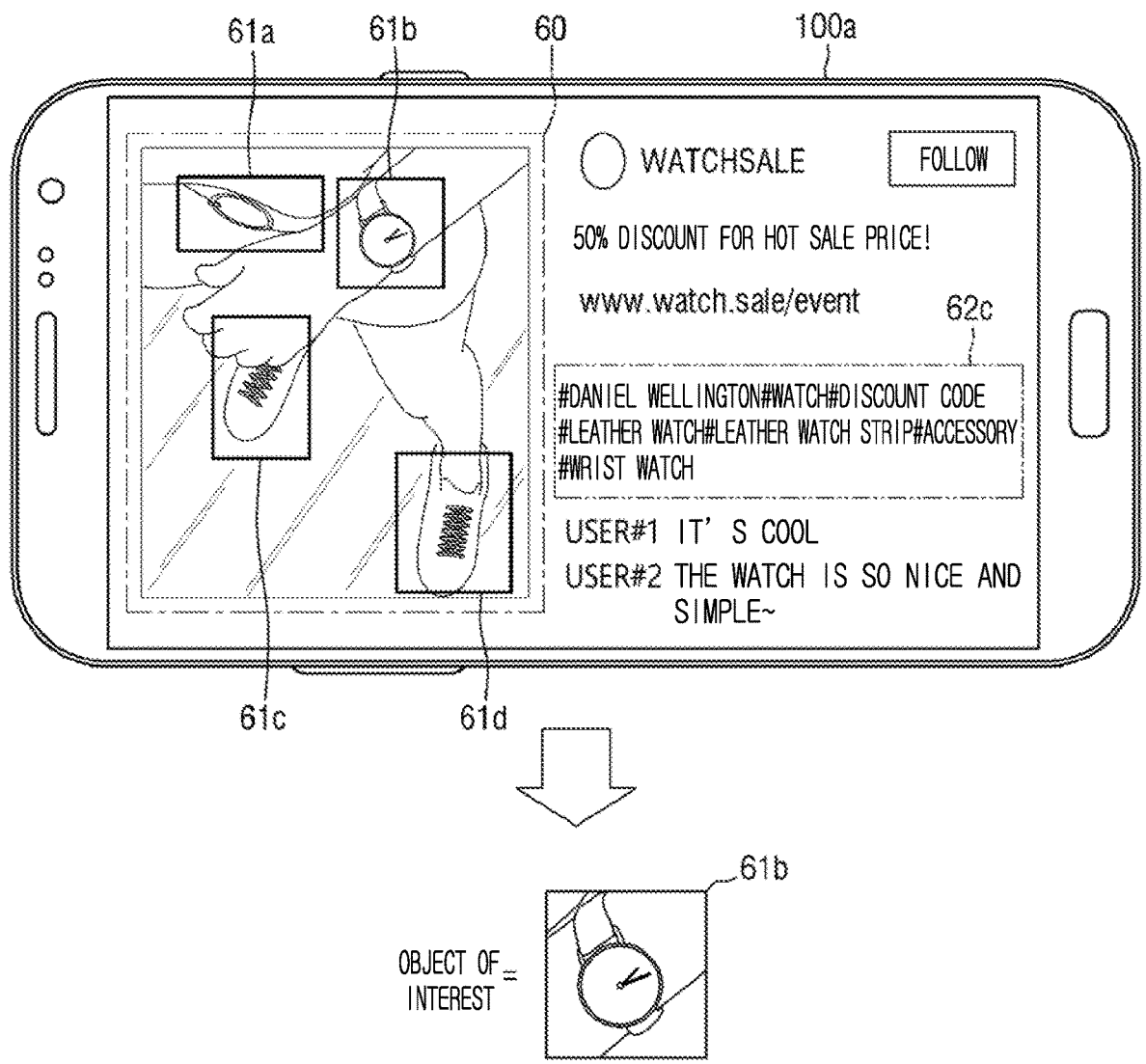
FIG. 5 is a concept diagram illustrating selection of text-based object of interest according to embodiments.

In another embodiment, as shown in FIG. 5, text displayed concurrently with image 60 may be used as the context information. It may be unreasonable to interpret that the entirety of the text displayed simultaneously with the image 60 is associated with the image 60. In one embodiment, text displayed adjacent to the display area of image 60 may be used as the context information. In other embodiments, a text to which an indicator, such as a # tag, is connected may be used as the context information.

As shown in FIG. 5, if the # tags 62c are displayed at the same time with the image 60, the subjects of the index tree nodes "watch," "leather watch," and "wristwatch" among the tags may be sensed, the watch image 61b that is the second candidate object among a belt image 61a that is a first candidate object, a watch image 61b that is a second candidate object, a part of an image 61c of the shoes that is a third candidate object, and an image 61d of the shoes that is a fourth candidate object, may be selected as the object of interest.

Although three context information types are illustrated with reference to FIGS. 3-5, the scope of the disclosure is directed to selecting objects of interest using various types of context information in which the semantics can be identified, as well as positioning information, voice and context information of a text. For example, if an odor recognition sensor is provided in an electronic device, the odor may also be utilized as the context information.

In one embodiment, the context information may be configured using data output in a context information generation model generated as a result of machine learning. The context information generation model is configured using, for example, an artificial neural network, and may be machine-learned using the various kinds of context information described with reference to FIGS. 3 to 5. The context information generation model will output context information in comprehensive consideration of the surrounding situation.

In the example of FIG. 5, a specific logic of selecting the watch image 61b as the object of interest will be described in greater detail below.

Figure 6:
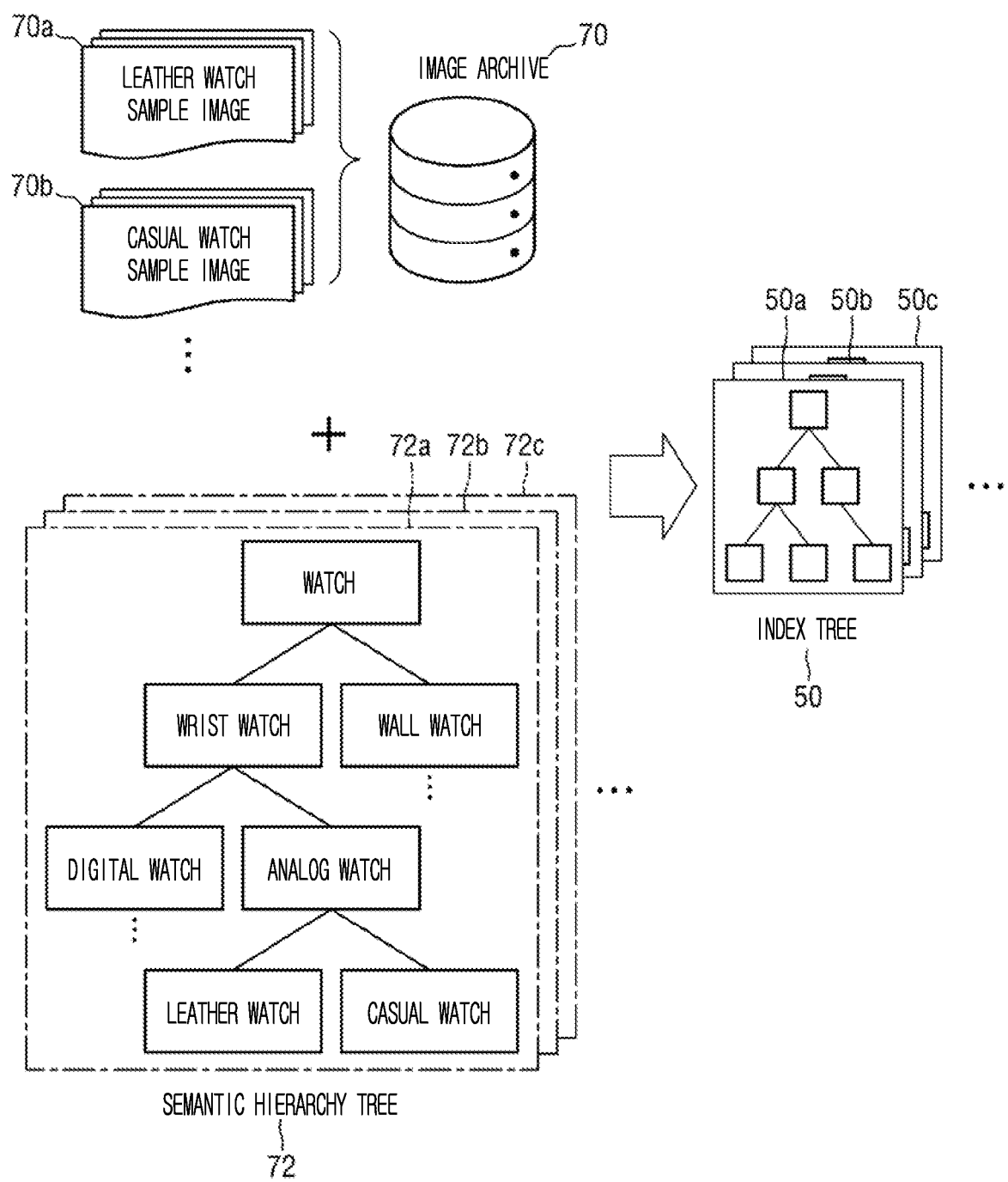
FIG. 6 is a concept diagram facilitating understanding of an index tree referred to in some embodiments.
Figure 7:
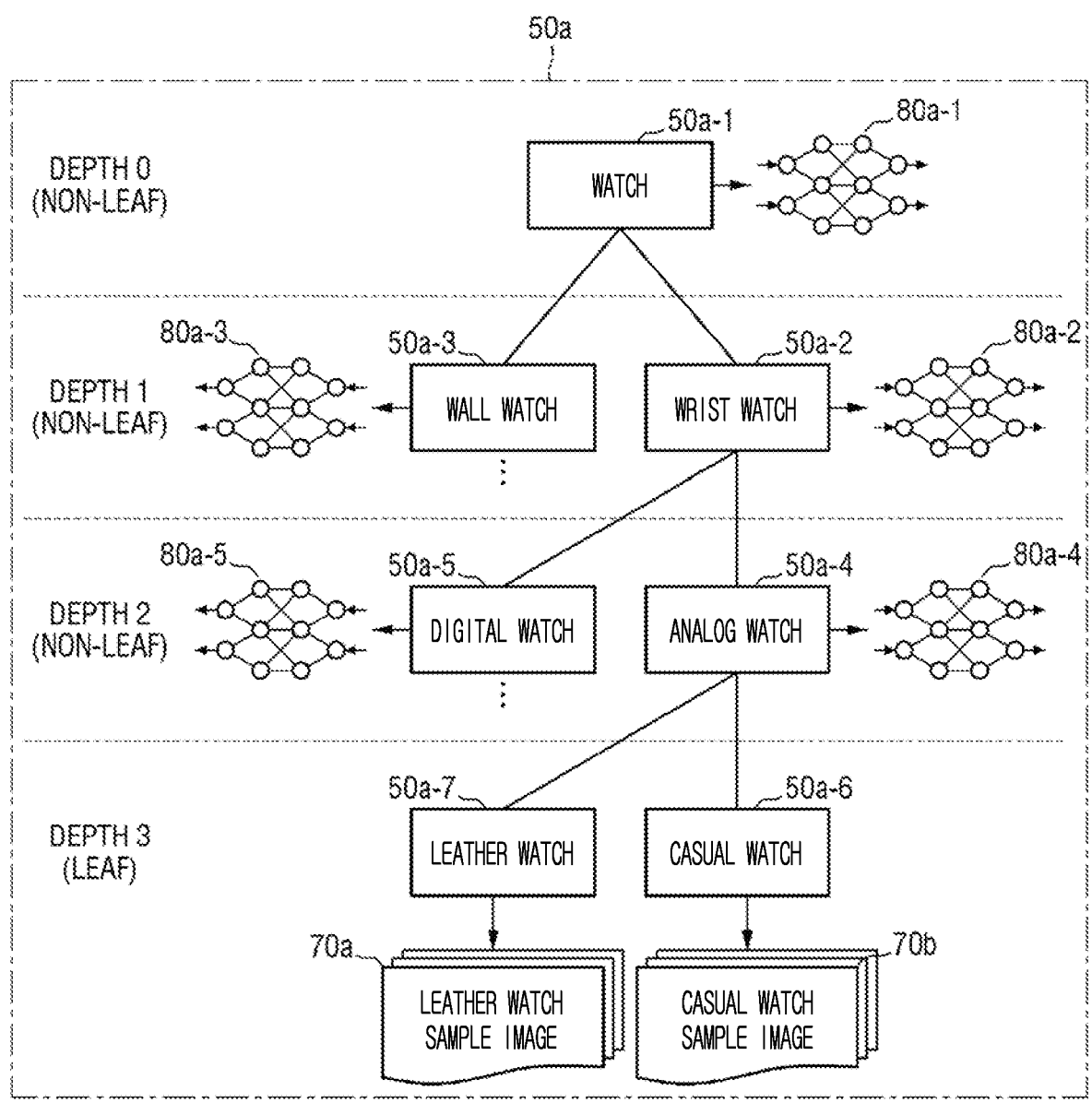
FIG. 7 is a concept diagram facilitating understanding of an index tree referred to in some embodiments.

With reference to FIGS. 6 and 7, the index tree 50 that serves as the reference data for selecting the object of interest in some embodiments will be described.

As shown in FIG. 6, the index tree 50 is configured using both the sample images of an image archive 70 and a semantic hierarchy tree 72. The index tree 50 may be configured and updated by the object of interest identification support device of FIG. 1. The index tree 50 may be configured and updated by all devices having computing means. The index tree 50 may be configured and updated by a device displaying an image.

The image archive 70 is a collection of sample images for each subject. The leather watch sample image 70a shown in FIG. 6 is a variety of images grouped based on the subject of "leather watch". Likewise, the causal watch sample image 70b is a variety of images grouped based on the subject of "causal watch". The image archive 70 may be a collection of feature data of a sample image rather than a sample image itself.

The semantic hierarchy tree 72 is a tree shape data representing the semantic hierarchical relationship of each subject. The semantic hierarchy tree 72 may be configured as a single tree having one root node, but if configured as such, all of the subject of the world should be hierarchically configured under one subject. Accordingly, this may result in inefficiencies in the data processing dimension, such as the deeper depth of the tree. As shown in FIG. 6, the semantic hierarchy trees 72a, 72b, 72c may be configured for some pre-specified subjects. In this example, the index tree 50 may also be configured with index trees 50a, 50b, and 50c by the same subjects as the subjects of the same semantic hierarchy tree.

Referring to FIG. 7, a detailed structure of the index tree 50a is described. As shown in FIG. 7, each non-leaf node 50a-1, 50a-2, 50a-3, 50a-4, and 50a-5 has a respective classifier 80a-1, 80a-2, 80a-3, 80a-4, and 80a-5. The leaf nodes 50a-6 and 50a-7 are linked to sample images 70a and 70b of the subject of each leaf node. All nodes of the index tree 50a have the subject. That is, all nodes of the index tree 50a have subject text. The subject text is compared to the context. The node of interest is selected based on a result of the comparison, and the index tree traversal with the leaf node linked to the sample image as a destination begins from the node of interest. Accordingly, the computing load required to search the sample image using the index tree is reduced, which will be described below.

Figure 8:
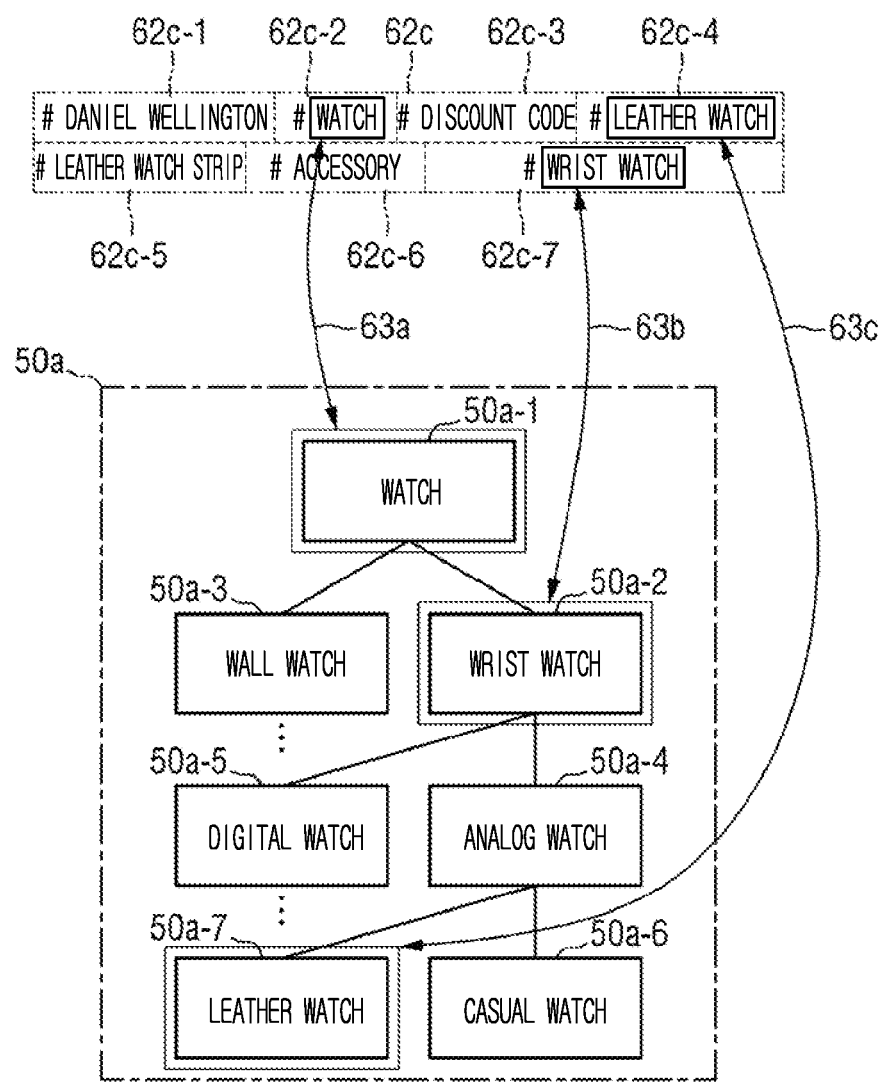
FIGS. 8, 9, 10, 11, 12 and 13 are concept diagrams illustrating the object of interest selection process according to embodiments.

FIG. 8 illustrates text-type context information 62c and index tree 50a. It is assumed that the context information 62c is a set of # tags. The context information 62c includes respective # tags 62c-1, 62c-2, 62c-3, 62c-4, 62c-5, 62c-6, and 62c-7. As such, the context information may include a plurality of context elements. The context information 62c shown in FIG. 8 is divided into seven context elements 62c-1, 62c-2, 62c-3, 62c-4, 62c-5, 62c-6, and 62c-7. As illustrated in FIG. 8, in some embodiments, the context information is divided into a plurality of context elements through analysis.

In one embodiment, the context information may be composed of heterogeneous context elements. For example, in a state where the # tags 62c shown in FIG. 8 are displayed adjacent to the image, if a user seeing the image says "Wow! The belt is pretty!", the voice is converted to text and the "belt" in the text is selected as the context element. This is because the "belt" is one of the index tree nodes. Then "belt" becomes the context element. In this example, if each of the # tags 62c-1, 62c-2, 62c-3, 62c-4, 62c-5, 62c-6, and 62c-7 is a text type context element, then the "belt" will be a voice type context element. The context information may be composed of heterogeneous context elements.

When each context element is identified, a node of the index tree 50a having a subject with a similarity to the semantics of the context element by a predetermined value or more is selected. The subjects of the nodes of the index tree 50a shown in FIG. 8 are [clock, wall clock, wrist watch, digital clock, analog clock, leather clock, casual clock], among which the node 50a-1 of the same subject as the context element 62c-2 of which semantics is a watch, a node 50a-2 of the same subject as the context element 62c-7 of which semantics a wristwatch, and a node 50a-7 of the same subject as the context element 62c-4 of which semantics is a leather watch are selected. The selected nodes 50a-1, 50a-2, and 50a-7 are nodes of interest.

In an embodiment, when there are a plurality of selected nodes of interests, the traversal start node for starting the traversal of the index tree may be selected among the selected nodes of interest.

According to a first embodiment of the traversal start node, the traversal start node is the node of interest with the largest depth value of the index tree 50a of the nodes of interest. The traversal start node corresponds to the most detailed subject of the context elements. That is, the traversal start node corresponds to the most detailed subject of the situation where the user exposed to the image is in contact. Accordingly, when a tree traversal is started from the traversal start node, there is an effect that the most detailed object of interest included in the image is selectable. According to the embodiment, even the detailed information of interest of the user may be obtained. Also, when the tree traversal starts from the traversal start node, the number of times of moving to the leaf node may be reduced. Reducing the number of times of moving may mean that the computing load is reduced to that extent.

According to a second embodiment of the traversal start node selection, a representative value of the index tree 50a depth value of the nodes of interest is calculated. The representative value is, for example, an average value or an intermediate value. The traversal start node is the node of interest of which depth value of the index tree 50a of the nodes of interest is closest to the representative value. For the first embodiment of the traversal start node selection, if the leaf node is reached, there is a risk that matching with the sample data of the leaf node may fail. In this example, it is necessary to move back to the root node direction to find another leaf node. That is, in the first embodiment of the traversal start node selection, if the sample data of the initially-reached leaf node is matched, it is possible to select an object of interest within a short time, but there is as much risk. In the second embodiment of the traversal start node selection, since the traversal start node corresponds to an intermediate degree specificity among the subjects of the context elements and thus, there is an effect of offsetting the risk of the previous embodiment.

FIGS. 9 to 13 illustrate based on an assumption that the object of interest is selected among a total of four candidate objects 61a, 61b, 61c, and 61d recognized in the images illustrated in FIGS. 2 to 5.

Figure 9:
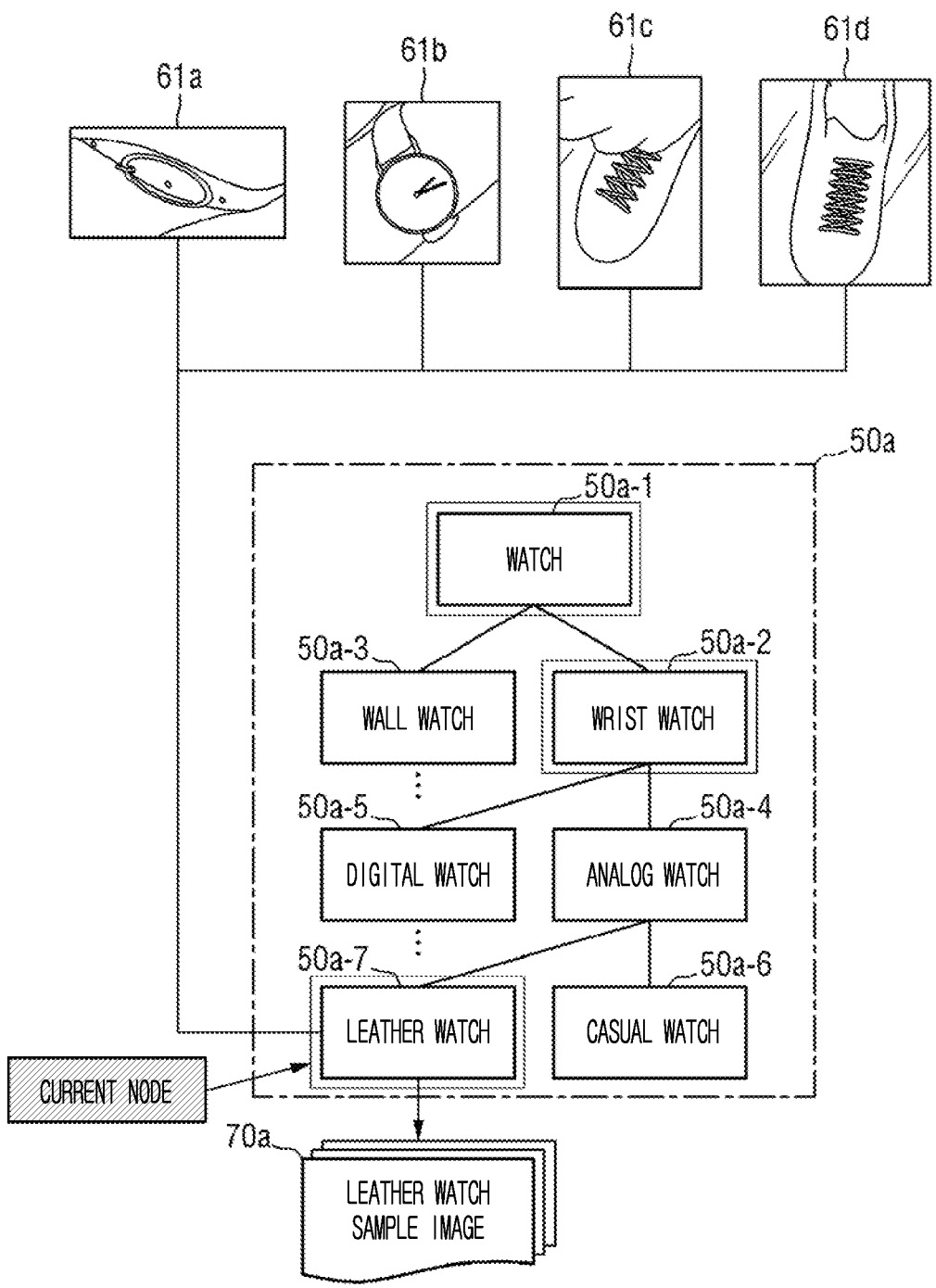
Figure 10:
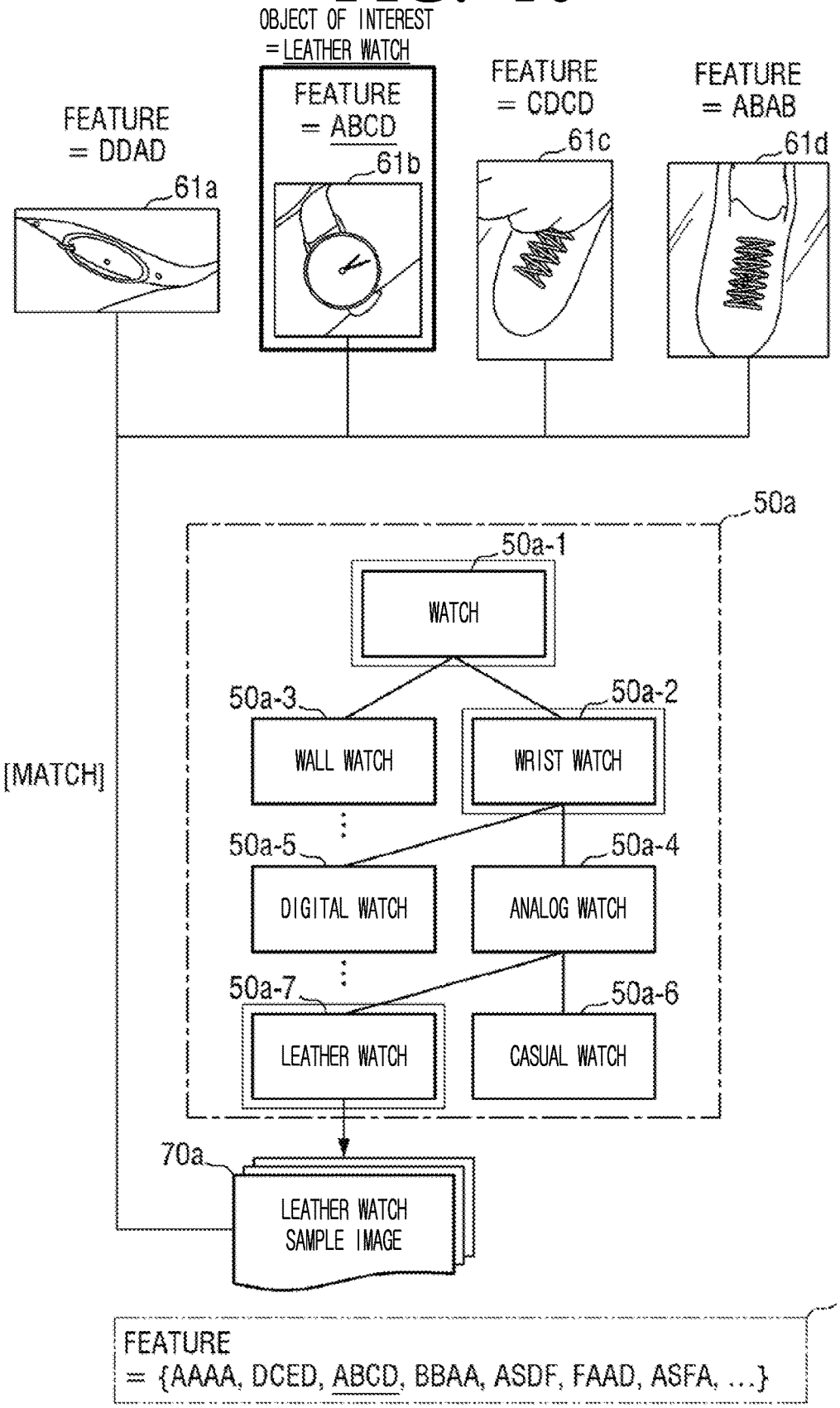

Referring now to FIGS. 9 and 10, a first embodiment of the traversal start node definition is applied. The traversal start node of the total of three nodes of interest 50a-1, 50a-2, 50a-7 is the lowest node 50a-7. FIG. 9 shows that the node 50a-7 is the current node of the tree traversal.

Since the current node is the leaf node, matching with a linked sample image is performed. For the matching, a feature data extraction operation for each of the candidate objects 61a, 61b, 61c, and 61d may be performed, and as a result, the feature data of each of the candidate objects 61a, 61b, 61c, and 61d may be obtained. Through matching between the feature data of each of the obtained candidate objects 61a, 61b, 61c, 61d and the feature data of the sample images 70a coupled to the current node 50a-7, it is identified if matching having a similarity greater than or equal to a reference value is found.

FIG. 10 illustrates this process. Among the feature data included in the feature data set 70a-1 of the sample images 70a, the same feature data as the feature data (ABCD) of the candidate object is present. Thus, in this case, the candidate object 61b will be selected as the object of interest. The subject of the object of interest is also determined as "leather watch". Through this, it may be estimated that the user viewing the image is interested in "leather watch."

Figure 11:
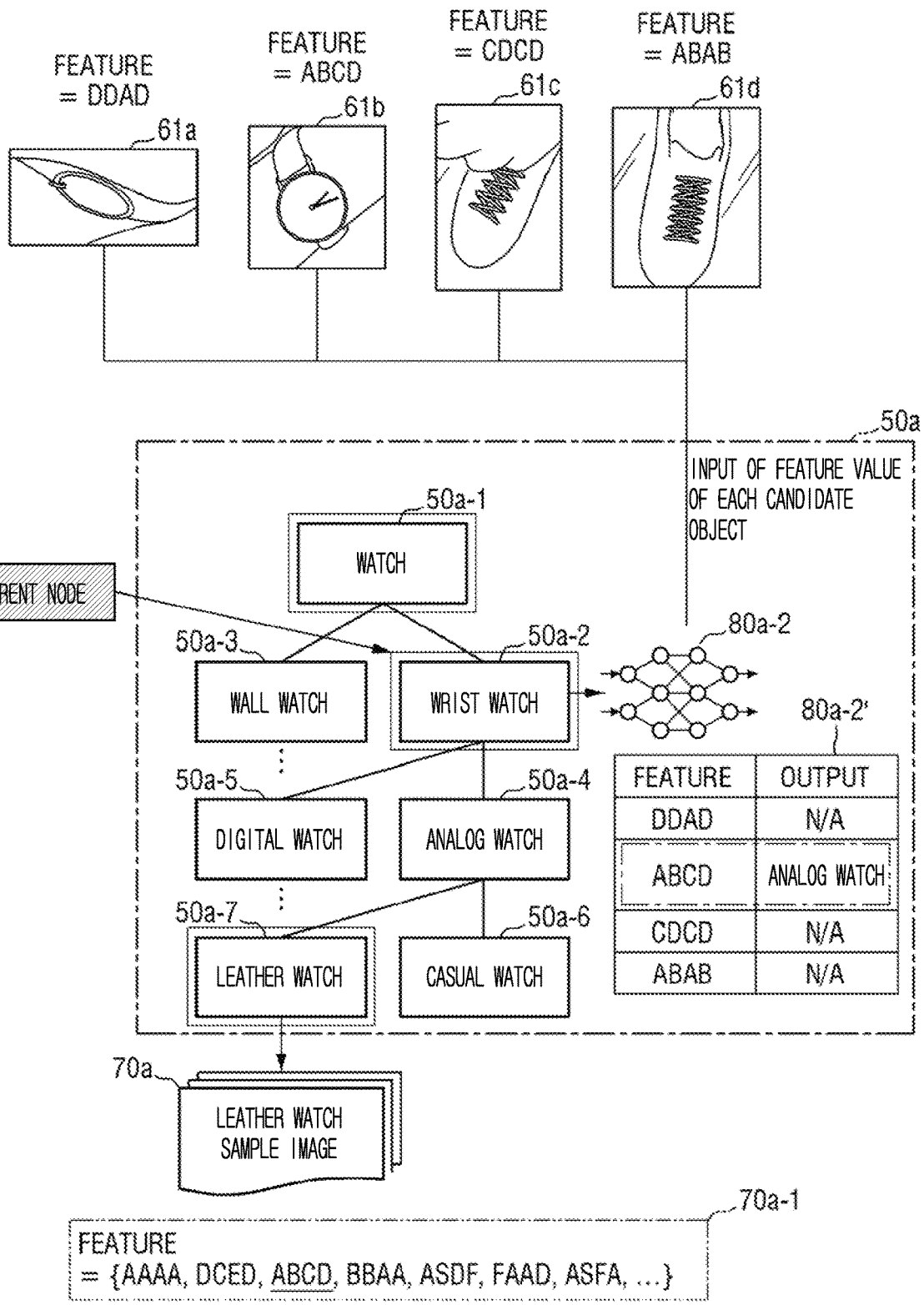
Figure 13:
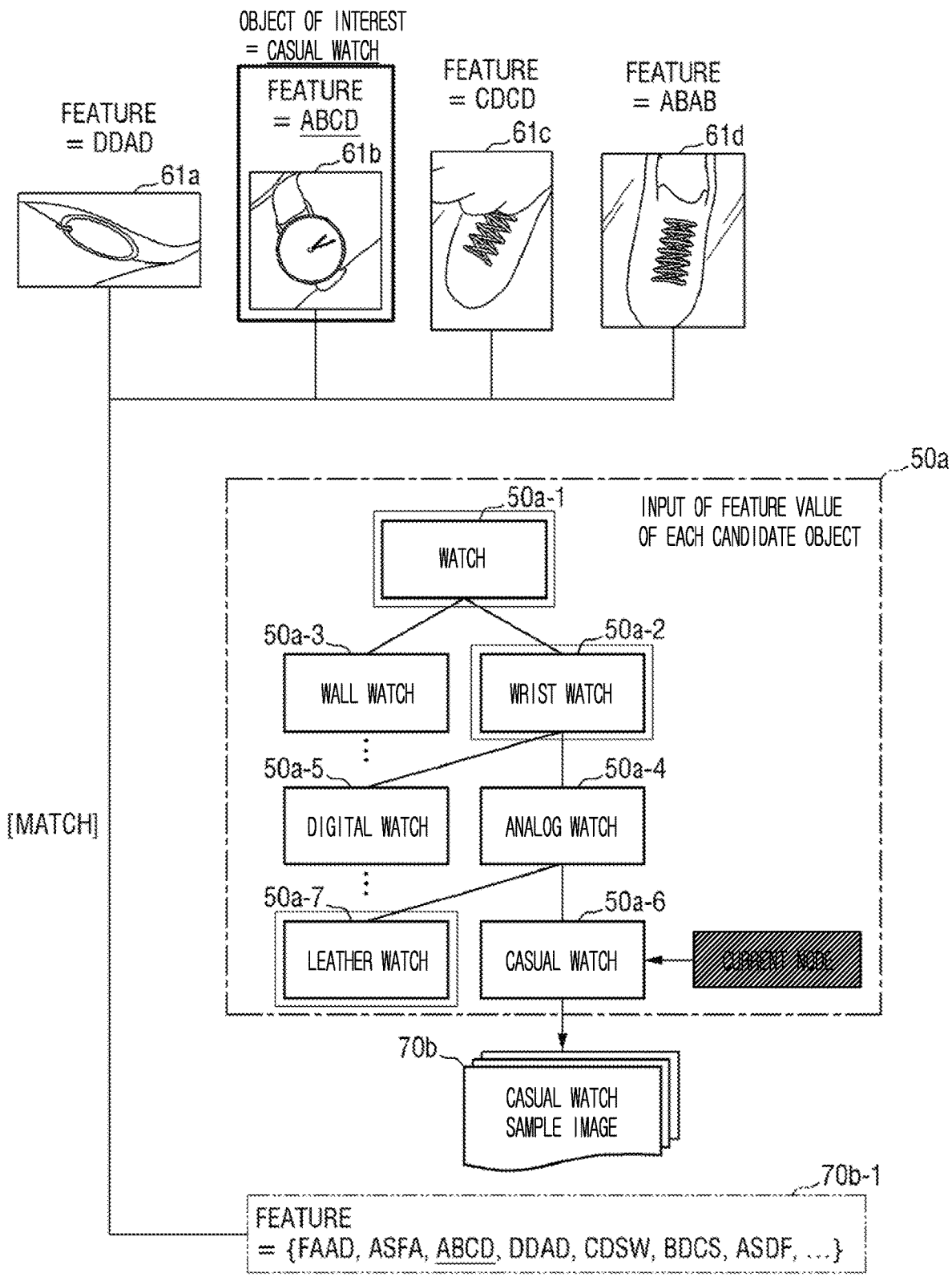

Referring to FIGS. 11 and 13, a second embodiment of the traversal start node definition is applied. The traversal start node of the total of three nodes of interest 50a-1, 50a-2, 50a-7 is an intermediate node 50a-2, which is a non-leaf node. FIG. 11 shows that the node 50a-2 is the current node of the tree traversal.

Since the current node is a non-leaf node, it is determined whether to move to any one of the child nodes 50a-4 and 50a-5 of the current node by the classifier output according to the feature data of each candidate object inputted to the classifier 80a-2 of the current node. For convenience, FIG. 11 illustrates the output 80a-2' according to inputting the feature data of a total of four candidate objects 61a, 61b, 61c, 61d to the classifier 80a-2. An output (N/A) indicating that there is no child node corresponding to all the candidate objects 61a, 61c, and 61d except one candidate object 61b is obtained. Thus, the next node will be an analog clock node 50a-4, which is a child node which the feature data of the candidate object 61b indicates.

Figure 12:
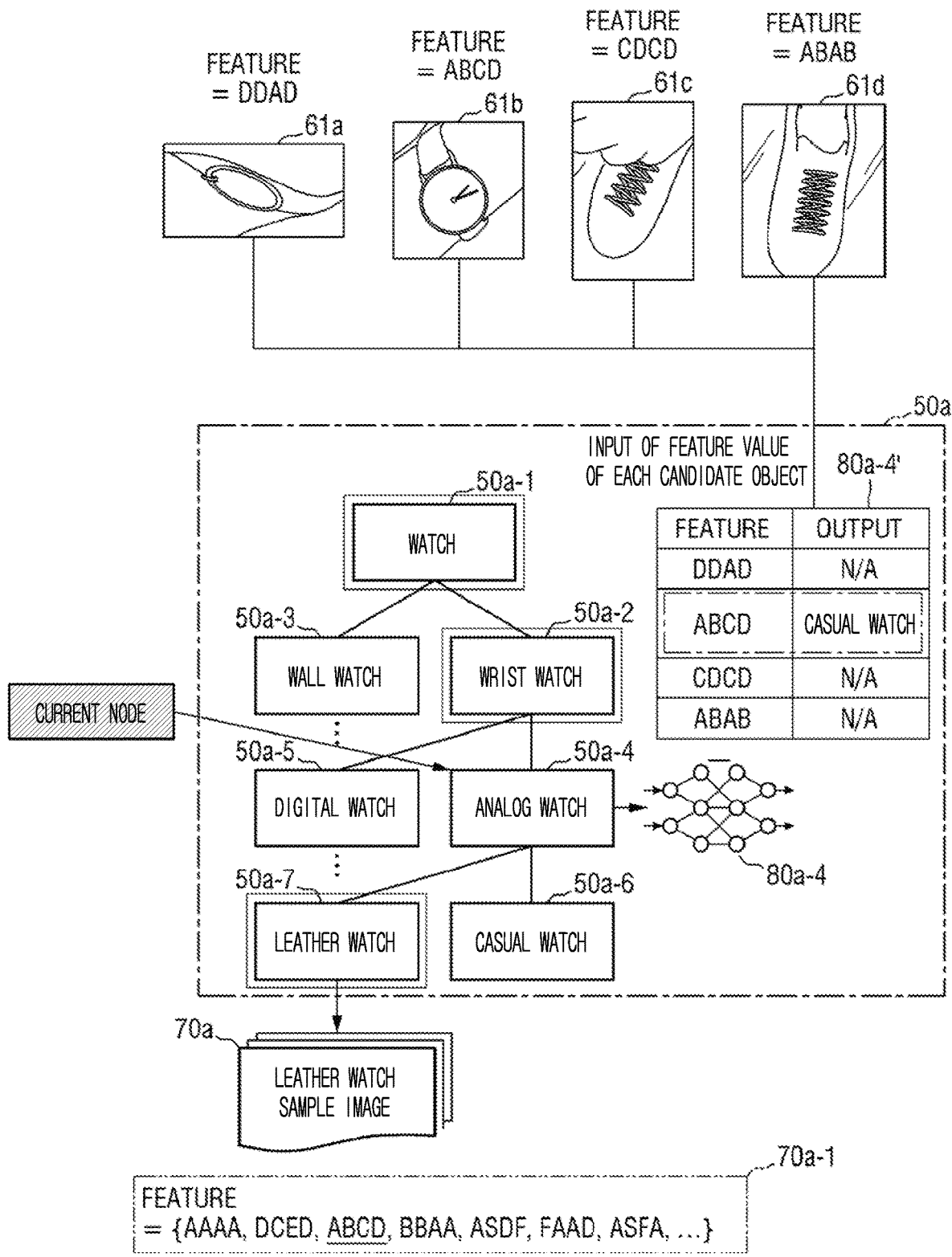

Referring to FIG. 12, the analog watch node 50a-4 is also the non-leaf node and thus, the next node is determined in the same manner as the wrist watch node 50a-2.

FIG. 13 illustrates that there is a case in which a causal clock node 50a-6 is determined as the next node of the analog clock node 50a-4, and the current node is the causal clock node 50a-6. Among the feature data included in the feature data set 70b-1 of the sample images 70b linked to the causal clock node 50a-6, the same feature data as the feature data ABCD of the candidate object is present. Thus, in this case, the candidate object 61b will be selected as the object of interest. In addition, the subject of the object of interest is also determined as "casual watch." Through this, it can be estimated that the user viewing the image is interested in the "casual watch."

According to the embodiment described with reference to FIGS. 11-13, it may be seen that a sample image matched in a different leaf node other than the node of interest may be found. That is, even if the subject of the context element is somewhat different from the subject of the node to which the sample image matched with the object of interest is linked, the leaf node linked to the sample image matched with the object of interest may be accurately searched through the traversal of the index tree 50a.

Some embodiments that may be considered in the traversal process of the index tree 50a are further described. It will be understood that the index tree traversal logic of the disclosure collectively reflects the embodiments described throughout this specification.

FIGS. 11 and 12 illustrate tables 80a-2' and 80a-4', which represent the output of the classifier. In the tables 80a-1' and 80a-4', there is an output indicating the child node for the at least one feature data, if the subject of the current node and the subject of all of the candidate objects 61a, 61b, 61c, and 61d are totally different from each other, the output of the current node's classifier will be a value indicating that there is no corresponding child node for the feature data of all candidates. In this case, the current node needs to travel in the direction of the root node.

According to a first embodiment of the reverse travel to an upper node, the next node of the current node is the parent node of the current node. If a leaf node (matching node) having sample data matched with an object of interest is a sibling node of the current node, there is an effect of quickly reaching the matching node according to the embodiment.

According to a second embodiment of the reverse travel to an upper node, the next node of the current node is the closest node of interest among the upper nodes of the current node. As previously described, the subject of the node of interest corresponds to the subject of the element in the context. That is, the node of interest is a node that is likely to become an important bifurcation in searching for the matching node. This embodiment allows the computing load to be reduced by not unnecessarily passing all non-leaf nodes in the opposite direction of travel to the upper node.

Since the current node is the leaf node, matching with the linked sample image is performed. For the matching, a feature data extraction operation for each of the candidate objects 61*a*, 61*b*, 61*c*, and 61*d* is performed, and as a result, the feature data of each of the candidate objects 61*a*, 61*b*, 61*c*, and 61*d* may be obtained. Through the matching between the feature data of each of the obtained candidate objects 61*a*, 61*b*, 61*c*, 61*d* and the feature data of the sample images 70*a* coupled to the current node 50*a*-7, it is identified whether there is matching with a similarity greater than or equal to the reference value is found.

Hereinafter, the configuration and operation of the electronic device 100 according to another embodiment will be described. The operation of the electronic device according to the embodiment should be understood to include an operation related to obtaining context data according to the embodiments described above, selecting a node of interest among nodes of the index tree, selecting an object of interest among the candidate objects through the traversal of the index tree, or the like, even if there is no additional description.

Figure 14:
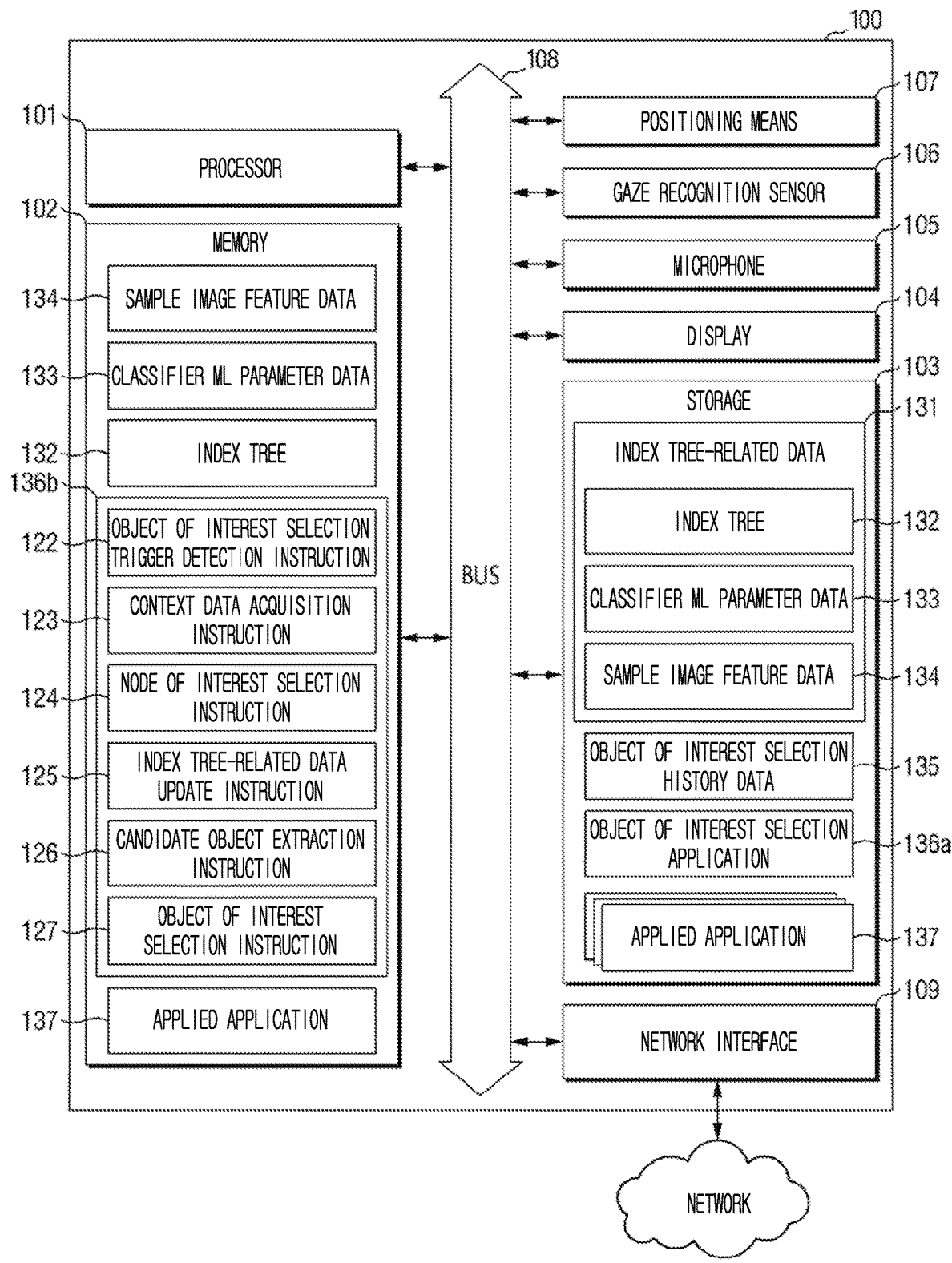
FIG. 14 is a configuration diagram of an electronic device according to another embodiment.

As illustrated in FIG. 14, the electronic device 100 according to the embodiment includes a processor 101, a memory 102, and a display 104. In some embodiments, the electronic device 100 may further include at least one of a positioning means 107, such as a global positioning system (GPS) signal receiver, a gaze recognition sensor 106, a microphone 105, or a network interface 109.

The system bus 108 serves as a data transceiving path between the internal elements of the electronic device 100, such as the processor 101, the memory 102 and the storage 103. The memory 102 may be, for example, a volatile data storage device, such as a random access memory (RAM). The storage 103 may be a non-volatile memory, such as a flash memory, or a data storage device such as a hard disk.

The instruction indicates a series of instructions that are grouped based on a function and are executed by the processor.

The storage 103 may store at least one of an index tree-related data 131, object of interest selection history data 135, an executable code of the object of interest selection application 136*a*, or one or more application applications 137.

It has already been described that the index tree-related data 131 may be received from an external device (for example, the object of interest identification support device of FIG. 1). The index tree 132 is the data constituting the index tree 50 described with reference to FIG. 6. The classifier ML parameter data 133 is data for configuring a classifier of each non-leaf node of the index tree 50. The sample image feature data is feature data of the sample images by subjects linked to each leaf node of the index tree 50.

According to one embodiment, upon booting the electronic device 100, the object of interest selection application 136*a* may be automatically executed and operated in a background mode. When an image is displayed in the various application applications 137, it is not limited to a specific application 137 and has an effect of generating user interest information (independent of the application). The object of interest selection application 136*a*, which is one of the application applications, may be executed only when there is a user's execution command, and may be implemented as an internal module of the specific application 137.

In FIG. 14, it is illustrated that the object of interest selection application 136*a* of interest is loaded into the memory 102 and stored 136*b*. When the object of interest selection application 136*a* is loaded into the memory 102, it is desirable that the index tree 132, the classifier ML parameter data 133, and the sample image feature data 134 included in the index tree-related data also be loaded into the memory 102.

Mutual association operations of various instructions of the object of interest selection application 136*b* that is loaded into the memory 102 and executed through the processor 101 will be described with reference to FIG. 10.

An object of interest selection trigger detection instruction 122 is executed, first. It is not desirable that the operation of selecting an object of interest is always performed. Let alone the problem of power consumption and the like, in order to generate user interest information, the object of interest needs to be selected from the displayed image at the time the user is interested in. The object of interest selection trigger detection instruction 122 identifies whether the user is currently viewing the image with the user's interest and it is the time to proceed the object of interest selection, from the data collected from various elements of the electronic device 100 and related operations, or the like.

Hereinafter, a variety of object of interest selection triggers are presented. In one embodiment, the object of interest selection trigger may have a requirement that at least one image is being displayed on the display 104. This is because the selection of the object of interest is impossible unless there is an image being displayed.

In one embodiment, the object of interest detection trigger may be that a user of the electronic device 100 detects manipulation associated with the image. Manipulation associated with the image includes a variety of operations that may be viewed as being interested in an image, such as, "like" associated with an image, zoom-in/zoom-out input, "sharing" of an image, "bookmark" manipulation, enlarging an image via a double tap, a manipulation of an on-line service uploading of a content including an image, a manipulation of downloading content including an image, and the like.

In another embodiment, the object of interest detection trigger may be that a keyboard is displayed on the display 104 while the image is displayed. Displaying a keyboard while the image is being displayed may refer to an action of inputting a letter associated with the image, and this may refer that the user is interested in the image.

In another embodiment, the object of interest detection trigger may sense that the user of the electronic device 100 manipulates a screen capture. Displaying a keyboard while the image is displayed may mean that the content including the image is to be stored or to be transmitted to others. Thus, the image included in the screen that is screen-captured may include the user's interest information.

In another embodiment, the object of interest detection trigger may be that gazing for more than a predetermined time has been detected via the gaze recognition sensor. Gazing for a predetermined time or more may be a positive evidence that the user is interested in.

In another embodiment, the object of interest detection trigger may be that a virtual assistant (or voice recognition assistant) is called while the image is displayed, and an operation on the current screen may be requested via the virtual assistant. Manipulation associated with the image via a virtual assistant may also indicate a user's interest in the image.

When a trigger occurrence is detected by the object of interest selection trigger detection instruction 122, the context data acquisition instruction 123 is executed. The context data acquisition instruction 123 may obtain context data associated with the image displayed on the display 104, through the manner described above with reference to FIGS. 2-5.

A candidate object extraction instruction 126 is executed for an image displayed on the display 104 at a time when the occurrence of the trigger is detected, so that a candidate object is detected in the image.

The candidate object extraction instruction 126 extracts one or more candidate objects included in the image using an object recognition model (not shown) generated as a result of machine learning. The object recognition model may be, for example, composed of an artificial neural network, in which case the memory 102 may be stored with a parameter set that defines the artificial neural network of the object recognition model. The parameter set may include information on the number of layers constituting the artificial neural network, the number of nodes for each layer, the weight between each node, and the like. The object recognition model may be received via the network interface 109 from an external device (not shown) that performs machine learning training to generate the object recognition model. The external device may be, for example, an object of interest identification support device described with reference to FIG. 1.

The machine learning training may be performed using sample data linked to each leaf node of the index tree 132 as a training dataset. In this example, the object recognition model may have the ability to recognize a candidate object, which is a region estimated as a region similar to any one of the entire sample data, among the entire input image regions. In this regard, the candidate objects may correspond to a region of interest (ROI) in image processing technology.

In one embodiment, the candidate object extraction instruction 126 may periodically/non-periodically update the object recognition model received via the network interface 109 from an external device (not shown) by incremental learning. The candidate object extraction instruction 126 may display a candidate object recognized in the image for the incremental learning and perform a process to obtain feedback on whether the candidate object recognition result is correct to the user. The candidate object extraction instruction 126 may update the object recognition model by using the feedback.

The candidate object extraction instruction 126 may use the plurality of object recognition models together to perform the candidate object extraction. The plurality of object recognition models may include a first object recognition model for extracting an object having a first feature in an image, and a second object recognition model for extracting an object having a second feature in the image. That is, the candidate object extraction instruction 126 may prevent the candidate object from being omitted by using the object recognition models that extract a region having a particular feature. The plurality of object recognition models may include both a model generated by the machine learning and a model using an image processing algorithm for the pixel values of the image.

In one embodiment, the object recognition model may be trained such that an output layer outputs feature data for each candidate object.

Next, the node of interest selection instruction 124 is executed. The node of interest selection instruction 124 may select the node of interest, among the nodes of the index tree, of which the subject is matched with the context element included in the context data, via the method described above with reference to FIG. 8. The node of interest selection instruction 124 references the index tree 132 in the node of interest selection process. The index tree 132 is the data in which the index tree-related data 131 is loaded into the memory 102 and stored, and the index tree-related data 131 may be updated by the index tree-related data update instruction 125.

Next, the object of interest selection instruction 127 is executed. The object of interest selection instruction 127 may select a node of interest among the candidate objects via the manner described above with reference to FIGS. 9 to 13. The object of interest selection instruction 127 references the index tree 132 for selection of the node of interest.

If the object of interest is selected according to the execution of the object of interest selection instruction 127, the data 135 for the selected history is stored. The object of interest selection history data may be time-series data including, for example, a "subject" of an object of interest by times, and may be transmitted periodically/non-periodically to the service server.

Hereinafter, a method of generating interest information according to another embodiment will be described with reference to FIGS. 16 to 17. The method for generating interest information may be performed by an electronic device. The method for generating interest information may be mainly performed by the electronic device, and some operations of the method for generating interest information may be performed by another device.

Figure 15:
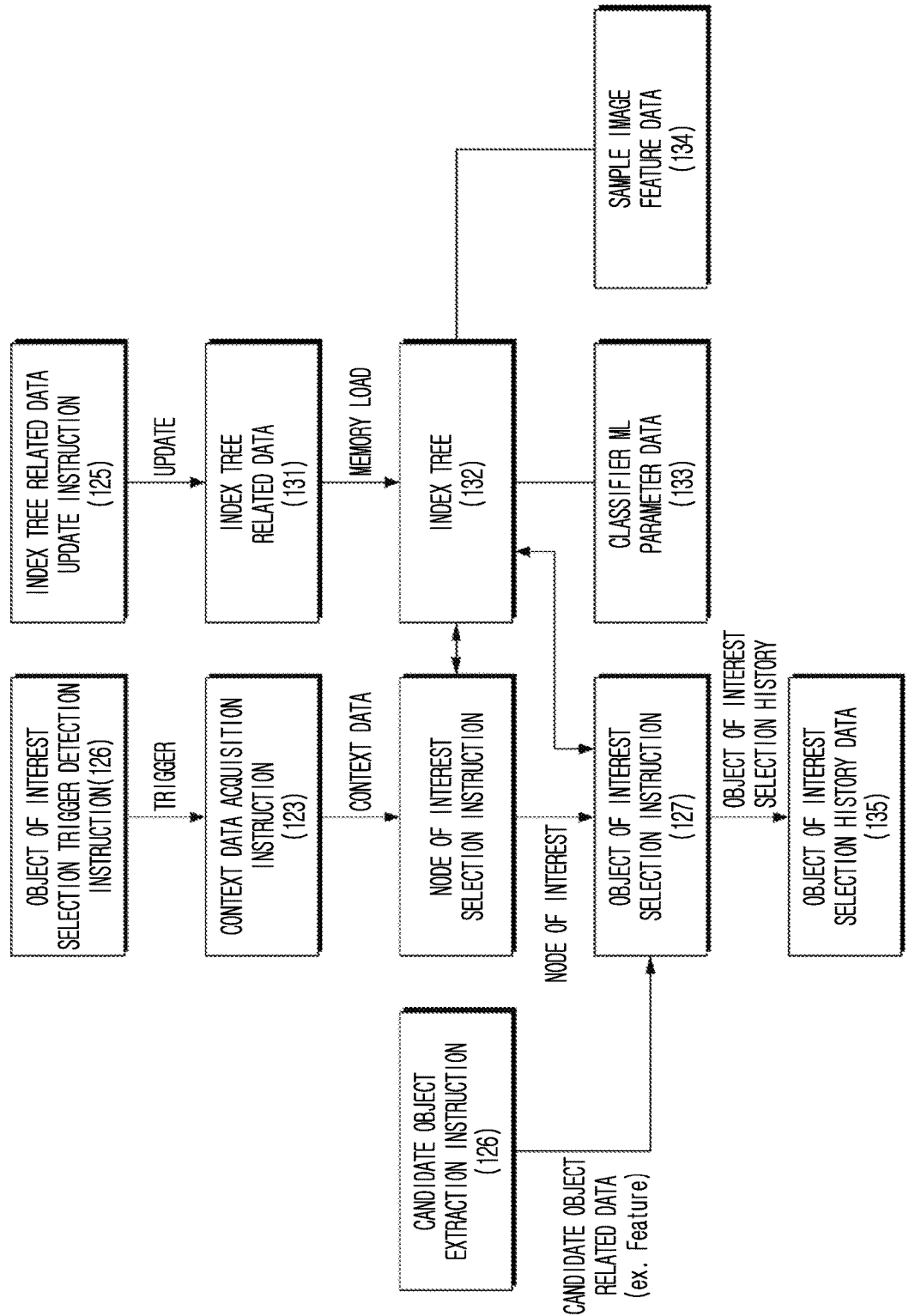
FIG. 15 is a concept diagram illustrating that the instructions illustrated in FIG. 14 are executed in association with each other.

The electronic device may be, for example, the electronic device 100 shown in FIG. 14. It is noted that the operation of the electronic device described with reference to FIGS. 14 through 15 and the description of FIGS. 1-13 referenced by the operation description of the computer device may be included in the method of generating the interest information. Accordingly, although there is no separate disclosure in the description of the method for generating the interest information described below, the operations described above with reference to FIGS. 1 through 15 may be included in the method of generating the interest information. In the description of the methods below, if there is no description of the subject of operation, the subject may be interpreted as the electronic device.

Figure 16:
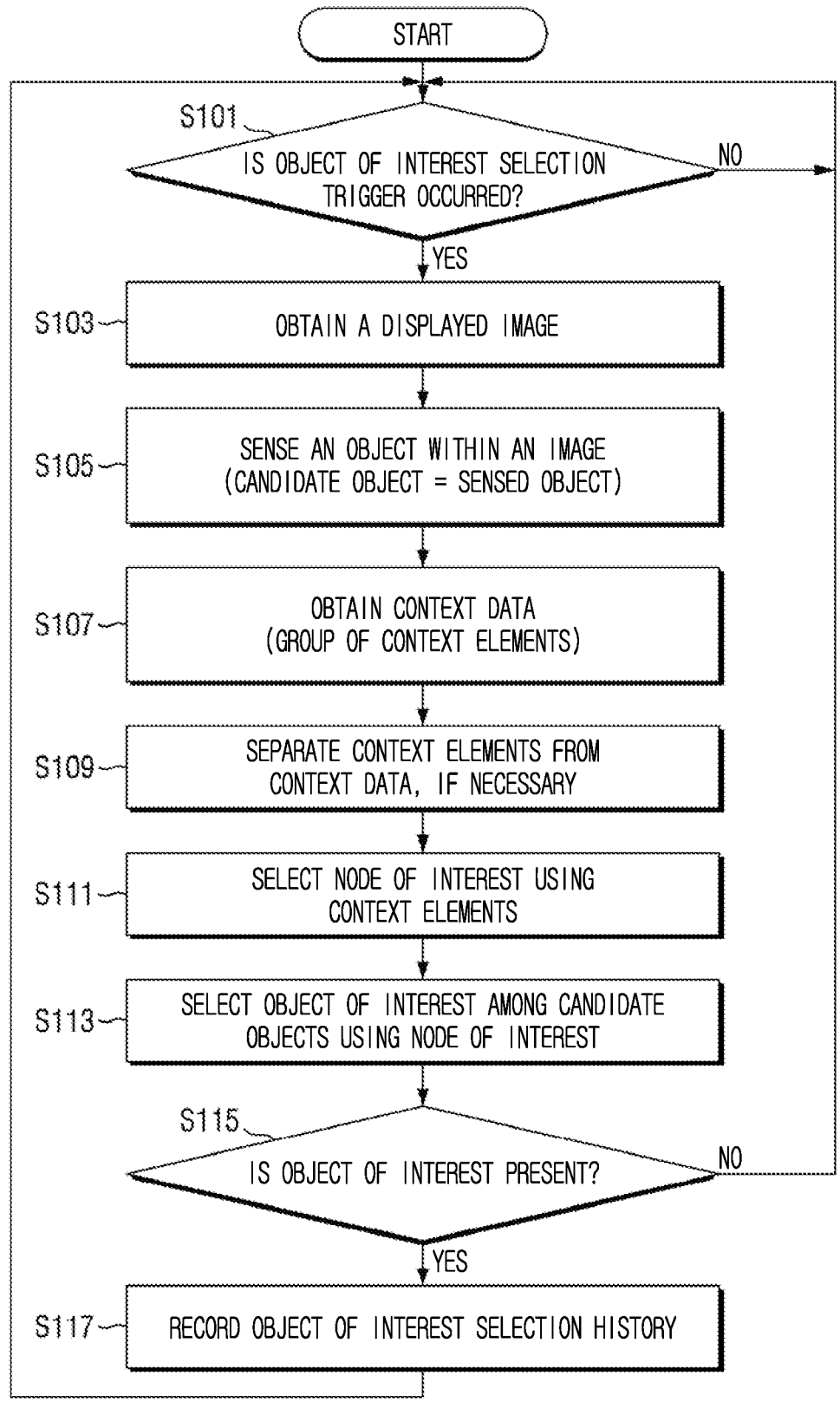
FIG. 16 is a flowchart of a method for object of interest selection according to still another embodiment.

The description is given with reference to FIG. 16.

In step S101, it is determined whether the object of interest selection trigger is generated. If it is determined that the object of interest selection trigger is generated, an image that is displayed at the time of occurrence of the trigger may be obtained in operation S103, but if not, it may be determined whether the object of interest selection trigger is generated.

In operation S105, one or more objects in the obtained image are sensed. The objects sensed at this time are referred to as candidate objects. Feature data of each of the candidate objects is generated. The operation of step S105 may refer to the operation of the candidate object extraction instruction described with reference to FIG. 15.

In operation S107, context data at the trigger occurrence time point is obtained. If the context data includes a plurality of context elements, then in operation S109, the context elements are identified individually through analysis of the context data.

In operation S111, among the nodes of the index tree, the node having a subject matched with the subject of the context element is selected as the node of interest.

In operation S113, an object of interest is selected from among the candidate objects using the node of interest. A detailed related operation will be described later. In some cases, the object of interest may not be selected among the candidate objects in operation S115. If the object of interest has been selected, a history of the object of interest selection may be recorded in operation S117, and the recorded history may be provided to the service server to be the base data of the personalization service for the user.

Figure 17:
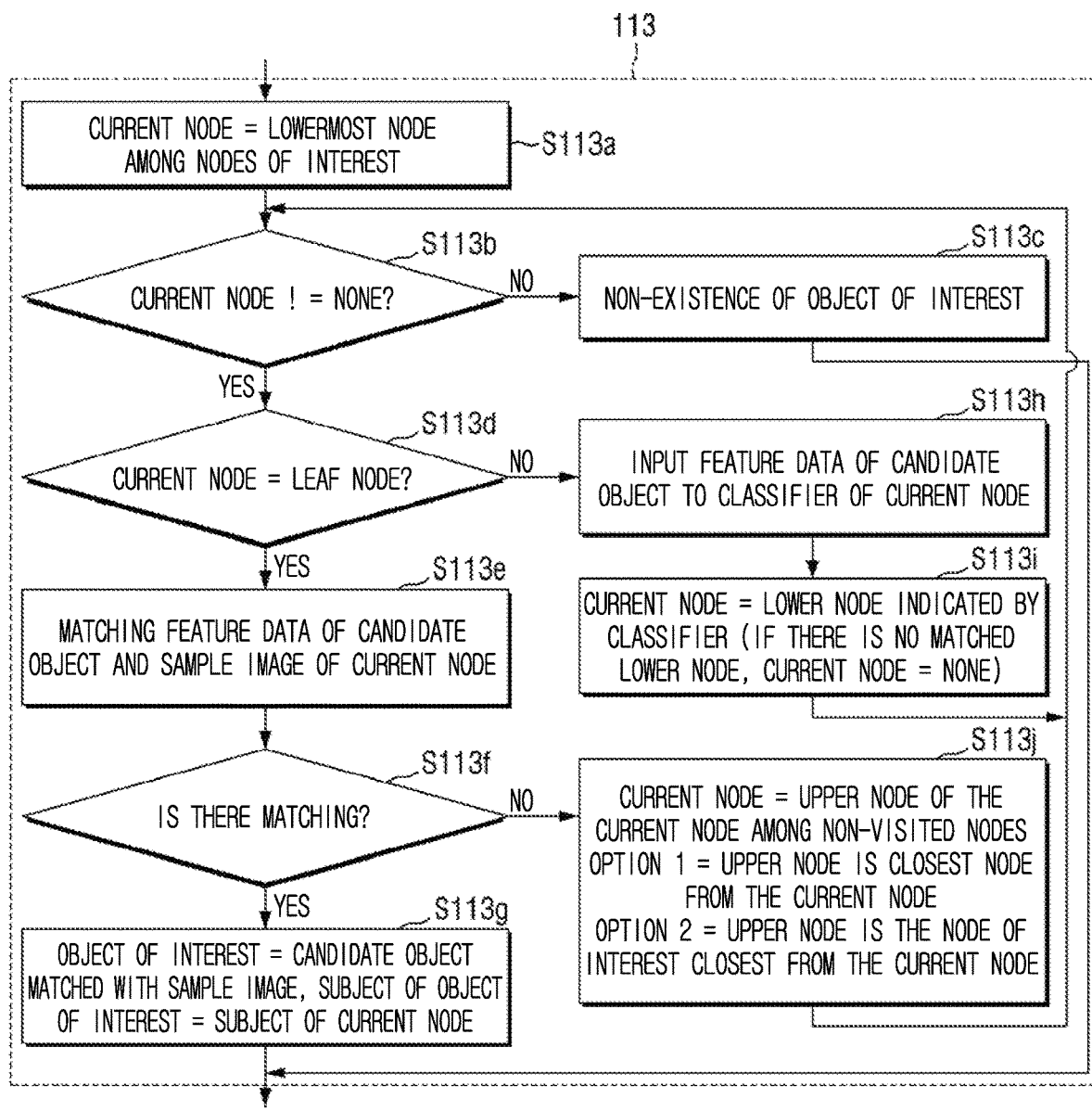
FIG. 17 is a detailed flowchart illustrating an operation of selecting an object of interest of FIG. 16 more specifically.

Referring to FIG. 17, a detailed operation in which the object of interest is selected among the candidate objects using the node of interest will be described. As described above, the traversal of the index tree is required for the selection of the object of interest, and this traversal starts from the traversal start node, which is one of the nodes of interest.

To facilitate understanding, an embodiment of selecting the lowermost node of the node of interest as the traversal start node is described in operation S113a. In tree traversal, the current node that means the node currently being determined is initialized to the traversal start node.

In operation S113b, it is determined whether the current node is not present. In step S113d, it is again determined whether the current node is the leaf node, as it seems unlikely a situation that the traversal start node is not present in the start timing.

If the lowermost node of the node of interest is the leaf node, in operation S113e, matching between the feature data of the candidate object and the feature data for each sample image of the current node is performed to determine whether a match is present in operation S113f. If there is a match, the object of interest may be a candidate object matched with the sample image, and the subject of the object of interest may be the subject of the current node in operation S113g.

If there is no match in operation S113f, it means that the reverse traversal should be done in the direction of the root node on the index tree to go up. At this point, the next node is the upper node of the current node. In this example, option 1 is to travel to a parent node of the current node, and option 2 is to travel to the closest node of interest among the upper nodes of the current node in operation S113j. The effects of each of the option 1 and the option 2 are described above.

In step S113d, the current node travelled as a result of the reverse traversal will not be the leaf node. Therefore, the current node may be updated in operation S113i by inputting the feature data of the candidate object to the classifier in S113h, and the traversal may continue in the direction of the leaf node again. If the leaf node as a result of the traversal is reached and it is determined that there is a match in operation S113f, the selection of the object of interest in operation S113g is made.

In step S113h, if the classifier outputs that the corresponding child node exists for a part of the candidate object, and outputs that the corresponding child node does not exist for the other part, the tree search for the candidate object in which the child node exists and the candidate object in which the child node does not exist may be divided. That is, for the candidate object in which a child node exists at a current node, which is the non-leaf node, traversal in the leaf node direction may be performed, and for the candidate object in which a child node does not exist, the tree traversal in the root node direction may be performed. According to another embodiment, for the candidate object in which the child node does not exist in a current node, which is the non-leaf node, it is identified that there is no possibility to be selected as an object of interest, and no further tree search may be performed.

In operation S113i, if the output of the classifier indicates that there is no lower node that matches with the feature data of all candidate objects, it is identified through operation S113b that the current node is not present and, as a result, it is determined that there is no object of interest in the candidate objects in operation S113c.

Methods according to embodiments described so far may be performed by the execution of a computer program embodied in a computer readable code. The computer program may be transmitted from a first computing device to a second computing device over a network, such as the Internet, to be installed in the second computing device, and thereby be used in the second computing device. The first computing device and the second computing device include all of a server device, a physical server belonging to a server pool for cloud services, and a fixed computing device such as a desktop PC.

The computer program may be stored in a non-transitory recording medium such as a DVD-ROM, flash memory device, or the like.

While the embodiments have been described with reference to the attached drawings, it will be understood by those skilled in the art to which the disclosure pertains may implement the embodiment in other specific forms without departing from the spirit or essential features. It is therefore to be understood that the above-described embodiments are illustrative and not restrictive.

What is claimed is:

1. An electronic device comprising:
a processor;
a display for displaying an image; and
a memory storing a plurality of instructions for execution by the processor,
wherein the plurality of instructions comprise:
one or more instructions for obtaining context data associated with an image displayed on the display;
one or more instructions for selecting, from among nodes of a semantic hierarchical index tree for searching for a sample image corresponding to a candidate object included in the image, a node of interest corresponding to the candidate object using the context data, wherein the node of interest is selected based on a comparison results between subjects of each of the nodes of the index tree and the context data; and
one or more instructions for selecting an object of interest among candidate objects included in the image by traversing the index tree in a top-down manner starting with the node of interest;
wherein the nodes of the semantic hierarchical index tree are hierarchically connected in accordance with semantic relationships among subjects of each of the nodes.

2. The electronic device of claim 1, wherein:
the context data comprises a plurality of context elements, and the one or more instructions for selecting the node of interest comprise instructions for selecting, as the node of interest, a lowermost node among the plurality of nodes corresponding to the plurality of context elements.

3. The electronic device of claim 2, wherein the plurality of context elements comprise a first context element and a second context element and the index tree includes a first node corresponding to the first context element and a second node corresponding to the second context element, and
wherein, based on the second node being, the lowermost node in the index tree as between the first node and the second node,
the one or more instructions for selecting the object of interest comprises:
one or more instructions for searching for an object corresponding to the first node among the plurality of candidate objects based on failing to identify an object, among the candidate objects, corresponding to the second node; and one or more instructions for selecting an object of interest among candidate objects included in the image using the first node.

4. The electronic device of claim 3, wherein:

the first node has a depth of N, where N is a natural number greater than or equal to 1, on the index tree, and the second node has a depth of N+2, where N is a natural number greater than or equal to 1, on the index tree, the one or more instructions for searching for an object corresponding to the first node among the plurality of candidate objects comprises, based on failing to identify an object, among candidate objects, corresponding to the second node, comprises an instructions for passing one or more nodes present between the second node and the first node and traveling to the first node.

5. The electronic device of claim 1, wherein the one or more instructions for selecting the object of interest comprises:

one or more instructions for searching for an object corresponding to a node higher in the index tree than the node of interest among the plurality of candidate objects, based on failing to identify an object, among the candidate objects, corresponding to the node of interest; and one or more instructions for selecting an object of interest among candidate objects included in the image using the higher node.

6. The electronic device of claim 1, wherein:

the nodes of the index tree comprise leaf nodes and non-leaf nodes, each of the non-leaf nodes comprises a classifier for receiving feature data and generating an output indicating a child node corresponding to the feature data, the one or more instructions for selecting an object of interest among the candidate objects included in the image comprises:

one or more instructions for, based on the node of interest being one of the non-leaf nodes, inputting feature data of the candidate object to the classifier of the node of interest and traveling to a child node indicated by output of the classifier; and one or more instructions for repeating the instruction to travel to a child node until one of the leaf nodes is reached.

7. The electronic device of claim 6, wherein:

each leaf node corresponds to one or more images matched to a subject allocated to the leaf node among each sample image of a plurality of sample images of an image archive, the one or more instructions for selecting an object of interest among the candidate objects included in the image comprises:

one or more instructions for, based on reaching one of the leaf nodes, identifying whether a sample image matched with the reached leaf node matches the candidate object; and one or more instruction for selecting, as the object of interest, the candidate object that is identified as being matched with the sample image matched with the reached leaf node.

8. The electronic device of claim 6, wherein:

the one or more instructions for selecting an object of interest among candidate objects included in the image comprises one or more instructions for traveling to a higher node in the index tree than a current node based on the output of the classifier of the current node indicating that a child node corresponding to the feature data is not present for any candidate object;

the higher node being a closest higher node, among higher nodes of the index tree, matched with one of a plurality of context elements included in the context data.

9. The electronic device of claim 1, wherein the one or more instruction for obtaining the context data comprises one or more instructions for obtaining context data matched with a subject of at least some nodes among the nodes of the index tree.

10. The electronic device of claim 1, wherein the one or more instructions for obtaining the context data comprises one or more instructions for obtaining, as the context data, position information of the electronic device.

11. The electronic device of claim 1, wherein the one or more instructions for obtaining the context data comprises one or more instructions for obtaining, as the context data, a text that is generated by converting voice data input through a microphone while the image is being displayed on the display.

12. The electronic device of claim 1, wherein the one or more instructions for obtaining the context data comprises one or more instructions for obtaining the context data based on sensing a trigger of an object of interest selection operation, and wherein the trigger is indicative of sensing an operation associated with an image of a user of the electronic device.

13. The electronic device of claim 12, wherein:

the display comprises a touch display, the one or more instructions for obtaining the context data comprises one or more instructions for, based on sensing the trigger of the object of interest selection operation, obtaining the context data, and the trigger is indicative of displaying a keyboard on the display while the image is being displayed.

14. The electronic device of claim 12, wherein:

the one or more instructions for obtaining the context data comprises one or more instructions for obtaining the context data, based on sensing the trigger of the object of interest selection operation, and the trigger is indicative of sensing a screen capture manipulation.

15. A method executed by an electronic device, the method comprising:

obtaining context data at a time of displaying of an image;

selecting, from among nodes of a semantic hierarchical index tree to search for a sample image corresponding to a candidate object recognized in the image, a node of interest corresponding to the candidate object using the context data, wherein the node of interest is selected based on comparison results between subject of each of the nodes of the index tree and the context data; and selecting an object of interest among the plurality of candidate objects by traversing the index tree in a top-down manner starting with the node of interest, wherein the nodes of the semantic hierarchical index tree are hierarchically connected in accordance with semantic relationships among subjects of each of the nodes.

16. The method of claim 15, wherein:

the nodes of the index tree comprise leaf nodes and non-leaf nodes, each of the non-leaf nodes comprises an inherent classifier, the inherent classifier configured to receive feature data of an image to generate an output indicating a child node corresponding to the feature data, and each leaf node corresponds to one or more images allocated to the leaf node among each sample image of a plurality of sample images of an archive, and the selecting the object of interest comprises:

based on the node of interest being one of the non-leaf nodes, inputting feature data of the candidate object to the classifier of the node of interest and traveling to a child node indicated by output of the classifier;

repeating the traveling to a child node until one of the leaf nodes is reached;

based on reaching one of the leaf node, identifying whether a sample image matched with the reached leaf node matches with the candidate object; and selecting, as the object of interest, the candidate object that is identified as being matched with the sample image matched with the reached leaf node.

17. The method of claim 16, wherein:

the plurality of candidate objects comprise a first object and a second object, and the traveling to the child node indicated by the output of the classifier comprises:

based on an output of the classifier according to an input of feature data of the first object indicating traveling to one of child nodes of a current node and an output of the classifier according to input of feature data of the second object indicating that a child node corresponding to the second object is not present, splitting a tree search for the first object and a tree search for the second object.

18. The method of claim 16, wherein:

the plurality of candidate objects comprise a first object and a second object, the traveling to the child node indicated by the output of the classifier comprises, based on an output of the classifier according to an input of feature data of the first object indicating traveling to one of child nodes of a current node and an output of the classifier according to input of feature data of the second object indicating that a child node corresponding to the second object is not present, terminating a tree search for the second object.

* * * * *